US006993695B2

(12) United States Patent
Rivoir

(10) Patent No.: US 6,993,695 B2
(45) Date of Patent: Jan. 31, 2006

(54) METHOD AND APPARATUS FOR TESTING DIGITAL DEVICES USING TRANSITION TIMESTAMPS

(75) Inventor: Jochen Rivoir, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 748 days.

(21) Appl. No.: 09/875,567

(22) Filed: Jun. 6, 2001

(65) Prior Publication Data

US 2002/0188888 A1 Dec. 12, 2002

(51) Int. Cl.
*G01R 31/28* (2006.01)
*G06K 5/04* (2006.01)

(52) U.S. Cl. .................... 714/734; 714/742; 714/744; 714/700

(58) Field of Classification Search ............... 714/700, 714/724, 734, 742, 744; 341/155; 324/765
See application file for complete search history.

(56) References Cited

U.S. PATENT DOCUMENTS

| | | | | |
|---|---|---|---|---|
| 5,231,598 A | * | 7/1993 | Vlahos | 714/700 |
| 5,436,908 A | * | 7/1995 | Fluker et al. | 714/700 |
| 5,717,704 A | * | 2/1998 | Rosenfeld | 714/736 |
| 6,363,053 B1 | * | 3/2002 | Schuster et al. | 370/230 |
| 6,609,077 B1 | * | 8/2003 | Brown et al. | 702/117 |
| 6,661,810 B1 | * | 12/2003 | Skelly et al. | 370/516 |
| 6,675,117 B2 | * | 1/2004 | Adam et al. | 702/106 |

* cited by examiner

*Primary Examiner*—Guy Lamarre
*Assistant Examiner*—Esaw Abraham

(57) ABSTRACT

A method and apparatus for testing a device using transition timestamp are used to evaluate output signals from the device. The method comprises the steps of performing timing tests on a signal from the device; and independently carrying out bit-level tests on a signal from the device. The independent timing tests and bit-level tests can be performed in parallel. The bit-level tests and apparatus comprise iteratively measuring a coarse timestamp for a transition in the signal and comparing the measured coarse timestamp to an expected timestamp to determine whether the device meets specifications. Whether the device meets specifications depends on whether, during the comparison step, the presence of a bit-level fault is detected. The apparatus and method may comprise Skew Fault detection, Bit Fault detection, No Coverage Warning detection and/or Drift Fault detection. An automatic testing system for testing devices comprises subsystems that incorporate the apparatus and method.

36 Claims, 10 Drawing Sheets

METHOD AND APPARATUS FOR TESTING DIGITAL DEVICES USING TRANSITION TIMESTAMPS

TECHNICAL FIELD

The invention relates to testing and test instrumentation. In particular, the invention relates to testing complex systems and integrated circuits that have potentially large skews or delays between data and a master clock.

BACKGROUND ART

Digital systems and the semiconductor devices or integrated circuits (ICs) that invariably make up the systems are continuing to evolve and become more and more complex. Concomitant with the increase in complexity is a decrease in the use of or strict adherence to a uniform, chip-wide or system-wide clock signal. Instead, clock signal distribution delays and related non-deterministic signal-to-clock skews inherent in large, complex systems and integrated circuits (ICs) are often accounted for in the design of the IC or system. During the development of such systems, tolerance for the expected and non-deterministic delays and skews is simply 'built-in' to the system design. This built-in tolerance enables the systems to operate properly in the presence of the delays and skews.

For example, in some large ICs, a signal distribution bus may include a clock signal line or a strobe line that is routed along with the data lines of the bus thereby insuring that data and clock or strobe experience similar time delays. Routing of a strobe along with the data is sometimes referred to as a source synchronous bus design. In source synchronous bus designs, local subsystems on the IC derive clock signals or timing information from the bus clock signal(s) or strobe. Thus, the individual subsystems are often poorly synchronized relative to the master clock but are largely immune in an operational sense to the delay effects of the data bus routing. Differential processing delays within individual subsystems of an IC also often can be accounted for with this approach by allowing the subsystems to generate strobes to signal to other subsystems that valid data has been placed on the bus.

In other instances of design methodologies for large ICs and systems that attempt to minimize the operational effects of delays and skews, timing and/or bit level synchronization is provided by or embedded in the data itself. An example of this approach is found in so-called asynchronous serial communications channels such as RS-232C. In instances where timing information is provided by or embedded in the data, the subsystems derive a local clock from the data as it arrives at the subsystem. The effect of non-deterministic, time varying skews experienced by the data is thereby rendered essentially irrelevant because the receiver's clock recovery circuit tracks the skew. Among the causes of non-deterministic skews are temperature variations during operation.

Furthermore, in some complex systems and ICs multiple clocks with varying clock rates are employed. The use of multiple clocks in an IC is often referred to as a multiple clock domain IC. The use of multiple clocks in an IC can cause non-deterministic behavior at the bit level. Again, the system or IC design takes into account the potential for non-deterministic bit-level performance enabling proper operation. Moreover, even when a common clock is used throughout an IC or system, modern complex ICs are often designed to tolerate and even expect relatively large differences or 'skews' between clock signals at various points within the IC.

The presence of non-deterministic skews and chips designed to tolerate large skews combined with market pressures for lower IC and system costs result in a need for incorporating tolerance to a range of skews into an IC design and test. In the end, the trend is that as complexity increases, the ICs and the systems that use them are tending to exhibit an overall decrease in the phase relationship between the chip-wide or system-wide clock and the digital data generated by these ICs and systems.

The trend toward decreasing tightness or loosening of the phase relationships between data and clock can and does create significant problems for the testing of devices and systems. These problems are often most apparent when testing modern systems and ICs using automated test equipment (ATE). However, testing with other means can also be adversely effected by the reduced phase relationship between data and clock. In the worst case, the test system will fail devices that are actually functioning according to the design specifications simply because the test system incorrectly accounted for the reduced tightness of the data/clock phase relationship of the device under test (DUT).

To better understand how clock skews and clock delays can pose a problem for conventional testing using ATEs and related test systems consider that during operation an ATE typically generates a chip-wide, common clock signal along with one or more analog and/or digital waveforms that act as input data. The input data is applied to inputs of the device under test (DUT). The DUT processes the data and generates output data that is sampled by the ATE using the master clock. The sampled data typically are compared to expected data to determine whether or not the device is operating properly and to verify that the device meets the specifications.

Conventionally, the ATE attempts to accurately strobe or sample the output data at a beginning and ending time window in which a given logic level output is expected. When the strobed logic level is not as expected, the conclusion is that either a timing error or a bit error has occurred. To resolve whether the error is timing related or bit related, expected levels must generally be known. In short, there is usually no explicit separation between bit level test and timing test in conventional testing systems and methodologies.

Unfortunately, as the non-deterministic/non-repeatable skew increases between the DUT output data and the common clock due to variations of the internal clock distribution and processing delays within the DUT, the validity of the sampled data collected by the ATE tends to decrease. Higher clock speeds only exacerbate the situation by reducing the sample period used by the ATE. Ultimately, the skew can become so severe that the ATE will consistently fail a properly functioning DUT. Even before the skew level has become severe enough for a complete breakdown in the ATE capability to differentiate operational and non-operational DUTs, the skew that may be tolerable in normal DUT operation can cause the ATE to intermittently fail DUTs, leading to a decrease in manufacturing yield and an increase in IC cost.

Several techniques are used to mitigate the effects of clock skew with respect to automated testing. In one technique, the same test of a given DUT is performed multiple times with a fixed, chip-wide clock. The clock is used as a sampling frequency establishing the sample time within each clock period at which the data output by the DUT is sampled or measured. Alternatively, the sampling of output data is performed at various different sample times within a clock period in each of several successive tests. The goal is to get at least one valid sample of each output data bit regardless of the phase relationship between the DUT clock and the sample time. The error maps generated during each of the multiple tests are examined to determine if all test vectors have passed all signals at least once during the series of multiple tests. Note that it is not generally sufficient that a first bit passes a first test vector while a second bit passes in a second test vector. Typically, both bits must pass in the same vector so to verify cross-pin timing. Among the disadvantages of this technique are long test times, fast overflow of the error maps used by the test equipment, and difficulty handling multi-period phase deviations.

In another technique, applicable primarily to the source synchronous bus and multiple clock domain situations, an application specific resynchronization circuit is used on the DUT interface board. The resynchronization circuit attempts to correct for any kind of skew between the ATE generated master clock and the sampled data generated by the DUT. Among the problems with using an application-specific resynchronization circuit on the DUT interface board is that it can reduce the reliability of the DUT interface board and introduce signal integrity problems due to the need for by-pass relays for timing tests and the DC parametric test. In addition, the use of an application-specific resynchronization circuit requires additional effort associated with the design of such a circuit. A related alternative technique to using an application-specific resynchronization circuit on the DUT board is to integrate a resynchronization circuit into the ATE that is as generic as possible. However, it is difficult, if not impossible, to develop a really 'generic' circuit that can handle not only all of the currently employed clocking schemes, but also accommodate future schemes.

Finally, in certain situations such as testing serial communication channels in which the bit timing is embedded in the data, a circuit added to either the DUT interface board or the ATE can be used to extract the timing information in much the same manner as is done by the communication channel devices themselves. This sort of circuit is often called a clock recovery or clock synchronization circuit. The main disadvantage of this sort of approach is that this approach is fairly specific to the type of embedded bit timing that is being employed and so there is considerable difficulty associated with designing a sufficiently generic clock recovery circuit, especially if the circuit is to be added to the ATE. In addition, in the presence of a marginally faulty DUT, the clock recovery circuit itself might not work reliably enough to definitively determine whether the DUT is faulty or not.

Accordingly, it would be advantageous to have a method and apparatus for testing devices using an ATE or related test system that makes the test system insensitive to so-called 'tolerable' skews, especially non-deterministic skews or drifts, between the testing system master clock and the output data or signal under test that is generated by the DUT. The ability of the test system to accommodate tolerable skews should be accompanied by an ability to flag skews that are considered too large based on the DUT design specifications. In addition, it would be desirable that such a method and apparatus be fairly generic in terms of covering a large variety of clocking protocols and applicable to a variety of test/analysis methodologies, including but not limited to, analysis of digital signals using ATE, verification tools, digital stimulus and response systems, and logic analyzers. Further, it would be desirable that the method and apparatus be applicable to tests ranging from chip-level to systems level testing. Such a method and apparatus would solve a long-standing need for complex digital IC and system testing.

SUMMARY OF THE INVENTION

The present invention provides a novel method and apparatus for performing digital waveform tests on a device under test that can accommodate skews, especially non-deterministic drifts, between a master clock and the data generated by the DUT. The method and apparatus of the present invention are useful for testing of a wide variety of test methodologies and test regimes ranging from chip-level to systems level testing. In the present invention, the testing of a DUT is divided into a pair of independent tests known as a timing test and a bit-level test. In addition, the measurements utilize transition timestamps to characterize signals under test. The result is a test method and apparatus that are extremely generic and can be implemented internal to a piece of automatic test equipment (ATE), thereby requiring no DUT board support.

In one aspect of the present invention, a method of testing a device using transition timestamps is provided. The method of testing comprises carrying out a bit-level test on the device that comprises the steps of measuring a coarse timestamp for a transition in a signal under test; and comparing the measured coarse timestamp to an expected timestamp to determine whether the device meets specifications. The steps of measuring and comparing are repeated iteratively for a sequence of transitions for the duration of the signal under test.

In one embodiment, the step of comparing comprises the steps of subtracting the measured timestamp from the expected timestamp to generate a skew value; and further, comparing the skew value to a specified maximum skew. A Skew Fault error is indicated when the skew value is greater than the specified maximum skew. In other embodiments, the step of comparing the measured timestamp to the expected timestamp comprises steps for detecting Bit Fault errors, No Coverage Warnings and Drift Fault errors in the signal under test.

In still another embodiment, the method further comprises performing timing tests on the signal under test independently of carrying out a bit-level test. The timing tests can also be performed in parallel with the bit-level tests. The timing tests comprise the step of generating a transition timestamp sequence for the signal under test. The transition timestamp sequence comprises timestamps on a set of transitions in the signal under test during the duration of the signal under test. The set of transitions may be a subset that is less than all transitions during a signal duration. The timing tests further comprise the step of checking the transition timestamps of the sequence. The step of checking preferably comprises computing timing information from the timestamps to determine whether timing of transitions meets device specifications.

In another aspect of the present invention, a method of determining whether a fault is indicated in bit-level tests on a device under test using transition timestamp sequences is provided. The method of determining comprising the steps of measuring a coarse timestamp for a transition in an output signal from the device under test during a signal duration; and subtracting the measured timestamp from an expected timestamp to generate a skew value. A Skew Fault is indicated when the skew value is greater than the specified maximum skew. The method of determining further comprises various steps to determine whether a Bit Fault is indicated, a No Coverage Warning is indicated, or a Drift Fault is indicated.

In still another aspect of the present invention, an apparatus for carrying out bit-level testing on a device using transition timestamp sequences is provided. The apparatus comprises a first coarse timing interval analyzer (TIA) that receives a signal from the device under test. The apparatus further comprises first and second first-in-first-out (FIFO) memory. The first FIFO receives a measured timestamp signal from the first TIA. The second FIFO receives an expected timestamp signal from expected data for the device. The apparatus still further comprises a first subtractor that receives the measured timestamp signal from the first FIFO and receives the expected timestamp signal from the second FIFO, and a Skew Fault detection circuit.

In one embodiment of the apparatus, the apparatus further comprises a Bit Fault detection circuit connected to an output of the first subtractor, and a No Coverage Warning detection circuit connected to an output of the second FIFO. In this embodiment, the apparatus still further comprises a first AND gate having one inverted input and one uninverted input. An output of the No Coverage Warning circuit is connected to the inverted input and an output of the Bit Fault circuit is connected to the uninverted input. The apparatus still further comprises a second AND gate having two uninverted inputs. The Bit Fault circuit output is further connected to one of the two second gate inputs and the No Coverage Warning output is further connected to another of the two second gate inputs.

In another embodiment of the apparatus, the apparatus further comprises Drift Fault detection circuitry. The Drift Fault detection circuitry comprises a drift difference circuit connected to the output of the first subtractor for measuring drift, and a time interval circuit, which is used to measure a time interval of the expected waveform, connected to the output of the second FIFO. In this embodiment, the apparatus still further comprises a drift fault comparator that compares an output signal from the drift measurement circuit to a second output signal from the time interval measurement circuit.

In yet another aspect of the present invention, an apparatus for generating coarse timestamps for transitions in signal under test is provided. The coarse transition timestamp apparatus has a synchronous coarse transition timestamp embodiment and an asynchronous coarse transition timestamp embodiment. Both embodiments generate timestamps with a resolution that is less than one half of a clock period, and preferably ⅓ of a clock period.

In yet still another aspect of the present invention, a system for automatically testing a device using transition timestamps is provided. The system comprises a timing test subsystem and a bit-level test subsystem. The timing test subsystem comprises using a precision timestamp generator or timing interval analyzer TIA. The bit-level test subsystem comprises using a coarse TIA or coarse timestamp generator. The subsystems can operate independently and in parallel to test the performance of a device. The system uses transition timestamps to characterize the device.

In still another aspect of the present invention, separate methods of carrying out a bit-level testing on a device under test using transition timestamp sequences are provided. The separate methods carry out bit-level Skew Fault error testing, Bit Fault error testing, and Drift Fault error testing as well as No Coverage Warning indication.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

Figure 1:
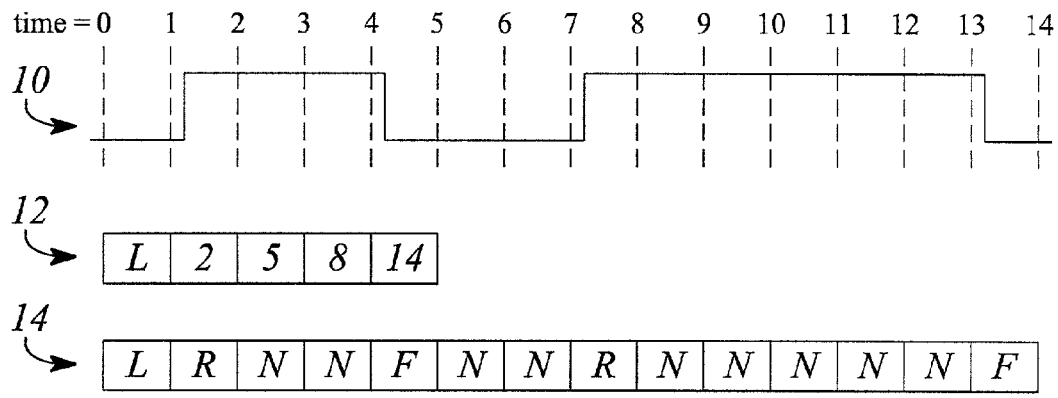
FIG. 1 illustrates a duality between a digital waveform represented as a sequence of "1s" and "0s" or "Highs" and "Lows" and as transition timestamp sequences.

The present invention is a novel method and apparatus for the testing of a device under test (DUT) that outputs a digital waveform. In particular, the method and apparatus of the present invention measure and utilize transition timestamps and or transition timestamp sequences to characterize various aspects of the DUT performance instead of the conventionally used logic-level sampling based on a master clock. The method and apparatus of the present invention are applicable to verification of or testing for the correct behavior of output signals of a DUT. Moreover, the present invention is applicable to any type of device, digital or analog, having one or more digital outputs that produce digital signals during a test. In addition, the method and apparatus are applicable to, but not limited to, testing with an automated test equipment (ATE) system, a logic analyzer, a bit error rate tester, and a protocol analyzer.

As used herein, the term 'digital signal' refers to a signal that, at any given moment in time, exhibits one of two allowed values or states, in the absence of noise. For example, a digital signal may comprise a voltage waveform that has two 'allowed' nominal voltage states. Traditionally, the two possible logic states of the digital signal are denoted as 'True' and 'False', 'High' and 'Low' or simply '1' and '0'. At any given time, the presence of one of the states is understood to represent a logic '1' while the presence of the other state denotes a logic '0'. Moreover, a given digital signal may be either an actual (i.e., physical) signal or a 'specified' signal. A specified signal is an abstract representation of an actual signal. Such an abstract representation may, for example, be stored in a computer memory and used to generate an actual signal. Often, specified signals are used to represent an expected signal against which an actual digital signal produced by a DUT is compared as part of a test to determine if the DUT is operating properly. A 'fully specified' digital signal is one in which a valid logic state is specified for all times during a signal period (i.e. there are no 'don't care' or undefined states in the signal period).

A specified digital signal can be represented by a starting logic value or state, either '1' or '0', and a sequence of timestamps, each timestamp denoting a time at which a logic state transition occurs. A logic state transition in a digital signal is defined as a transition from a first logic state to a second complimentary or opposite state (i.e. '1' to '0' or '0' to '1'). By knowing the starting logic state, the timestamps denoting logic state transitions uniquely determine the digital waveform corresponding to the timestamp sequence. In some testing situations, such as determining the time difference between two transitions, the starting value is of little or no interest and may be omitted from the timestamp sequence.

Often, although by no means all the time, a digital signal is generated from a sequence of bits where, for the duration of each bit period, the logic state of the bit determines the level 'High' or 'Low' logic value or state of the signal. The duality between representing a digital waveform as a sequence of '0s' and '1s' with associated time intervals and as a starting logic value with a sequence of timestamps is illustrated in FIG. 1.

FIG. 1 illustrates an example of a digital waveform 10 corresponding to a digital sequence of bits {010110}. As illustrated, the digital waveform 10 has a 'Low' starting value and includes four transitions. Sequences in FIG. 1 with reference numerals 12, 14 represent examples of timestamp sequences generated from the digital waveform 10. The generation of the timestamp sequences 12, 14 will be described in further detail hereinbelow.

The time scale at the top of FIG. 1 represents cycles of the timing clock used as a time reference to assign timestamp values. The timing clock typically has a higher frequency than the common clock used to drive the DUT and a maximum data rate expected for the signal under test. As illustrated, the timestamp sequences 12, 14 each begins with an indication of the waveform 10 starting value, namely 'L' for low, followed by a sequence of numbers or letters. The numbers in the first timestamp sequence 12 correspond to the timestamp values assigned to each transition detected in the waveform 10 based on the timing clock. The letters in the second timestamp sequence 14 illustrated in FIG. 1 represent the presence or absence of a transition during a given period or interval of the timing clock. In addition, the letters can indicate the type of transition as well (e.g., 'R'=rising; 'N'=no change; and 'F'=falling). For example, if it is known or assumed that transitions will nominally occur only in time intervals corresponding to ⅓ of the bit period, the timestamp sequence can be compressed to 'LRNNFNNRNNNNNF', three letters per bit period, as illustrated in the example of FIG. 1. One skilled in the art can readily identify similar timestamp sequences similar to the examples illustrated in FIG. 1. All such timestamp sequences are within the scope of the present invention.

Note that further compression of the timestamp sequence is possible when considering the representation of an expected signal as opposed to representing an actual signal. For an expected signal, it is possible to take advantage of known characteristics of the signal in creating the timestamp representation. For example, if it is known a priori that a transition only occurs during every third clock period of the timing clock, the time stamp sequence can consist of entries corresponding to only every third timing clock period. For example illustrated in FIG. 1 employing this approach would yield the compressed timestamp sequence 'LRFRNF' (not illustrated), one letter per three timing clock periods. This means that the expected signal requires considerably less space in a computer memory (e.g. ⅓ as much memory for the example illustrated in FIG. 1) than if every period of the timing clock was to be explicitly accounted for in the timestamp sequence.

It is important to note that the example illustrated in FIG. 1 is illustrative only. In particular, the frequency of the timing clock and the resulting resolution of the transition timestamps generated therefrom are chosen based on the type of test being performed. For instance, for bit-level testing it is often sufficient and sometimes even preferable, as will be discussed in detail hereinbelow, to choose a timing clock frequency that is more than 2 times a maximum bit rate and preferably, at least three times the maximum bit rate of the signal under test. On the other hand, for timing tests, high-resolution timestamps are typically required. Therefore, a relatively high frequency timing clock is generally necessary for timing tests since the accuracy of the timing measurement is a function of the time reference or timing clock frequency employed in the measurement.

In general, the DUT is tested by applying a signal to one or more input pin(s) or port(s) on the DUT and observing or measuring a response signal at one or more output ports or pins of the DUT. The response signal(s) is sometimes called a signal-under-test. For example, during a typical test of a digital DUT, a test or input signal may be applied to an input pin and an output or response signal produced by the DUT at one or more output pins is measured or recorded as a signal under test. In conventional testing, the measured signal under test then is compared to an 'expected' output signal and/or parameters extracted from the signal under test are compared to various specifications for the signal. In the case of a comparison with an expected output signal, the comparison is between the actual measured signal and the signal or data sequence that should be produced by the DUT at a particular output pin for a given signal-under-test or signals-under-test if the DUT is functioning properly. Comparing the measured output signal and the expected signal at specific points in time can be used to determine whether the device is functioning properly and within specifications. In addition, such comparisons with expected signals and with specifications also often can provide some indication of the nature of a failure should one be detected.

A transition timestamp sequence generated from a signal under test can be compared to an expected transition timestamp sequence generated for the expected output signal in a manner analogous to comparing the actual signals. Likewise, the transition timestamp sequence generated from the measured signal under test can be used to derive data that can be compared directly to a specification in an analogous manner. Advantageously, in many practical instances, the analysis tools used to model and predict the expected performance of a DUT actually generate timestamp sequences from which an expected signal can be generated. Measuring and comparing transition timestamps actually saves a step in the process compared to the conventional comparison of signals.

Figure 2A:
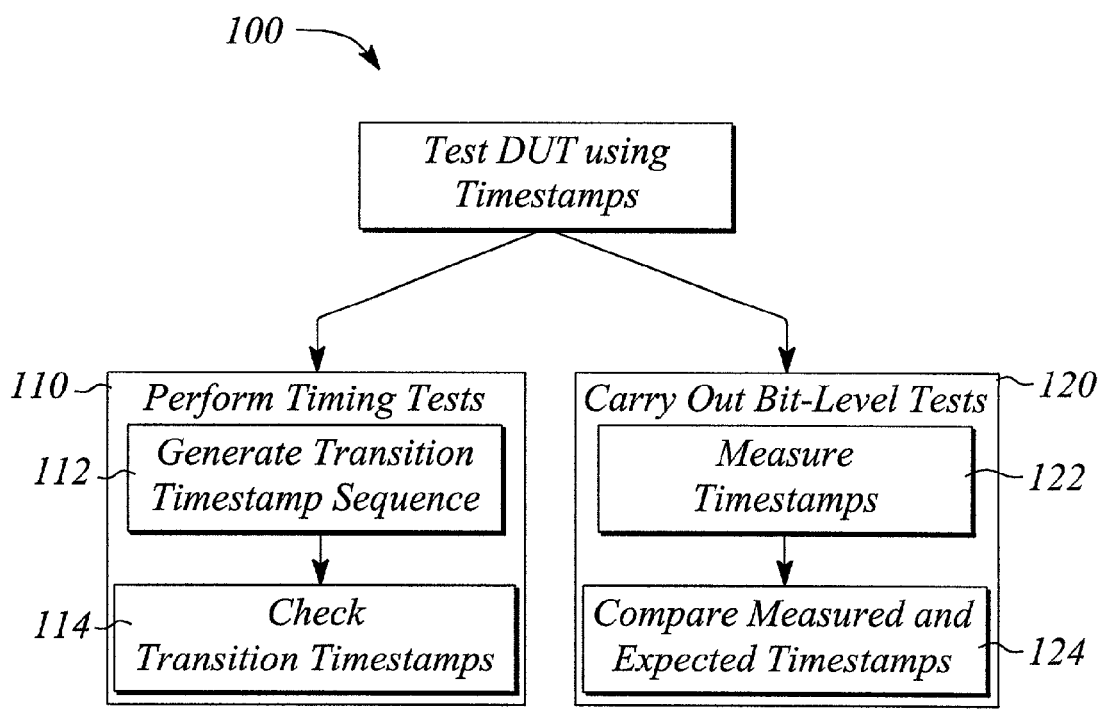
FIG. 2A illustrates a flow chart of a method of testing a device under test (DUT) of the present invention.

In one aspect of the present invention, a method 100 of testing a DUT using transition timestamp sequences is provided. A block diagram of the method 100 of testing using timestamps is illustrated in FIG. 2A. The method of testing 100 of the present invention comprises the step of performing 110 timing tests. For instance, the timing tests may check whether drift and jitter of data within one or more measured output signals are within a specified tolerance. In addition, the timing tests measure cross-pin timing characteristics between pairs of signals. Cross-pin timing tests include but are not limited to testing for setup and hold times of the DUT. Moreover, timing tests can and generally are performed without explicit knowledge of the exact expected signal or equivalently the expected bits associated with the signal.

The method of testing 100 of the present invention further comprises the step of carrying out 120 bit-level tests on the DUT. The step of carrying out 120 bit-level tests serves to verify that the output data in one or more output signals contains a sequence of logic bits corresponding to an expected sequence of logic bits. The step of performing 110 timing tests may be performed independently of the step of carrying out 120 bit-level tests. Alternatively, the steps 110, 120 can be performed in parallel on the same signal under test. Moreover, the steps 110, 120 can be performed sequentially without regard to the order in which the steps 110, 120 are performed.

Figure 2B:
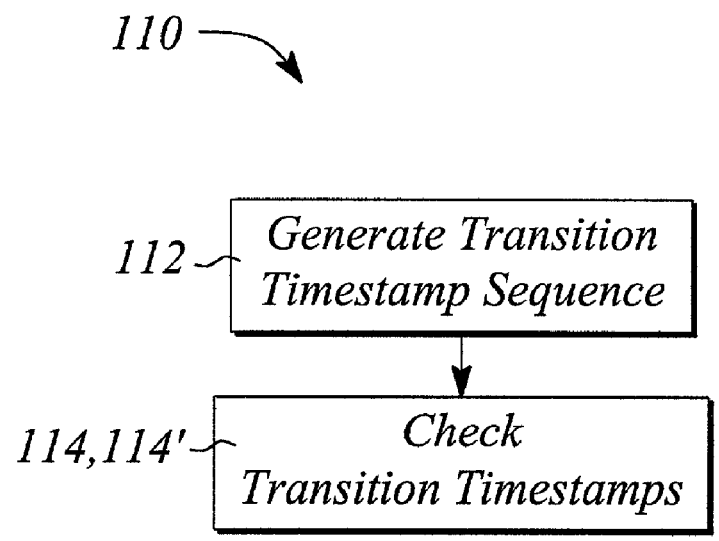
FIG. 2B illustrates a flow chart of an independent method of performing timing tests using a timestamp sequence of the present invention.

According to one embodiment of the method 100, the step of performing 110 timing tests comprises the step of generating 112 a transition timestamp sequence from a signal or signal(s) under test that is generated at one or more output pins of the DUT as a result of the application of an input signal. As noted about, the step of performing 110 timing tests can be performed independently as a method 110, as illustrated in FIG. 2B. For the purposes of the invention, the description of the step of performing 110 herein is the same for the method of performing 110.

Preferably the transition timestamp sequence of the step of performing 110 timing tests comprises timestamps for a subset of the transitions in the output signal. The step of generating 112 a transition timestamp sequence involves measuring and recording the time of occurrence of a succession of transitions detected in the output signal. The succession of transitions need not be a contiguous set of transitions. In fact, given the current state-of-the-art of precision timing interval analyzers (TIAs), it is generally difficult or impossible to make accurate, high precision measurements of transition times for every transition in a high-speed signal. Advantageously, the step of generating 112 preferably records the timestamps for only a subset of transitions. Generally, the step of generating 112 would record timestamps for as many of the transitions in the signal under test as are needed to make a pass/fail decision. Alternatively, only certain predetermined transitions occurring in certain predetermined time windows may be recorded as part of the subset.

In addition to recording transition timestamps for a subset of the transitions in the signal under test, the step of generating 112 may also record the transition direction of each timestamped transition. The term 'transition direction', as used herein, refers to whether the transition was from low to high, (i.e., a rising transition) or high to low, (i.e., a falling transition). In addition, as discussed hereinabove, a starting value of the timestamp sequence, either low or high, can be recorded. However, the starting value is of little practical use for timing tests, especially those using subsets of all of the transitions. One or more TIAs can be used to generate the measured transition timestamp sequences. One skilled in the art would readily be able to select a TIA suitable for generating timestamps for the step or method of performing 110 or the method 100 of the present invention.

Timing information recorded may reflect elapsed time relative to a global start time or may be the elapsed time between predefined transitions. A timing clock generates the timing information representing the timestamp value. The timing clock may or may not be related to the master clock used to drive the DUT. The transition timestamp sequence, thus generated, consists of an array or list of numerical values indicating the transition times and may, as noted above, contain a starting value and perhaps indications of transition types. The transition timestamp sequence 12 illustrated in FIG. 1 consists of numerical values generated from the digital waveform 10, wherein each numerical value corresponds to the timing clock value when a transition was detected.

The step of performing 110 timing tests further comprises the step of checking 114 the transition timestamps. The step of checking 114 can and usually does involve a number of different analyses depending on the type of timing test being performed. For example, in some instances the step of checking 114 may involve comparing the sequence of transition timestamps to a sequence of 'expected' timestamps. The expected timestamps are generated from information regarding the expected operation of the DUT. Alternatively, the timestamp values can be compared to one another to determine if the timing of transitions within the signal under test are consistent with the specification for the DUT.

In general, there are two main classes of timing tests that are performed on DUTs. The first class of timing tests is known as Jitter and Drift tests. The Jitter and Drift tests generally require the measurement of transition times for pairs of transitions separated by a predefined number of bits within a single signal under test. The time differences between these pairs of transitions are typically analyzed statistically to determine how consistently the time differences map to an average bit clock over time. Advantageously, the step of generating 112 transition timestamp sequences of the present invention can produce timestamp pairs within the sequence that can be used to perform Jitter and Drift tests.

The second class of timing tests is known as Cross-pin timing tests. Cross-pin timing tests compare the timing of events, usually transitions or groups of transitions, occurring in several different signals under test. Typically, Cross-pin timing tests comprise determining whether the relative transition times measured for one or more transitions in a plurality of signals under test meet a given set of specifications. For example, a Cross-pin timing test may attempt to determine whether a transition occurs in several separate signals under test during a specified time window. The specified time window may be defined relative to a master clock used to drive the DUT or a strobe or trigger signal on a data bus. On the other hand, a Cross-pin timing test may utilize the occurrence of a particular pattern of transitions in a data stream to act as a trigger for the time window. The Cross-pin timing tests are used to measure the relative time difference between one or more output signals, where the common drift and jitter should not contribute to the result.

Thus, in one embodiment, the step of checking 114 involves analyzing the transition timestamp sequence generated 112 from a single output signal from a signal output pin of the DUT. When the step of checking 114 involves a single output signal, it is sometimes referred to as a 'single signal test'. The first class of timing tests, Jitter and Drift tests, are single signal tests. Typically, further numerical processing is used to analyze the timestamp sequences of the single signal test. The additional numerical processing often includes using a Fast Fourier Transform on the transition data to generate a specific drift spectrum. Only a single TIA is required for a single signal test.

In an alternative embodiment, the step of checking 114' involves checking several timestamp sequences generated from several signals under test produced simultaneously at several output pins of the DUT. In some cases, the step of checking 114' is facilitated by deriving an expected timestamp sequence from one of the measured timestamp sequences and using the expected timestamp sequence to act as a trigger. When the step of checking 114' involves more than one output signal, it is sometimes referred to as a 'multiple signal timing test'. A single TIA can be used for Cross-pin timing tests by repeatedly applying the input signal and successively measuring each of the output signals. However, preferably, two or more independent TIAs are used, so that instantaneous common mode drift and jitter can be cancelled out. More preferably, every output signal being measured has a dedicated, independent TIA.

Typically, high accuracy TIAs are used for both the single signal and the multiple signal timing tests of the step of performing 110 timing tests. Since the essence of a timing measurement usually involves computing timing differences, the accuracy and precision of the TIA directly affect the accuracy and precision of the test in question. One skilled in the art would readily determine the required TIA precision and accuracy given the test specification details for a particular DUT and timing test.

A timing measurement utilizing transition timestamp sequences is advantageously very flexible. In particular, strobe-to-data grouping and types of clocking, such as dual edge strobing and multi-phase clock systems, do not affect the hardware design when utilizing transition timestamps sequences. In addition, utilizing transition timestamp sequences can advantageously facilitate a reduction in processing time for the tests in the step of performing 110 timing tests.

The processing time in the step of performing 110 timing tests can be minimized during the step of generating 112 by generating timestamp sequences that represent subsets of the total number of transitions, as described hereinabove. In other words, advantageously it is not necessary to accurately measure all of the transitions within a signal duration. For example, a subset of transitions corresponding to the worst-case timing can be selected based on DUT simulations. During the step of performing 110 timing tests, only transitions corresponding to these worst-case transitions are included in the timestamp sequence generated in the step of generating 112 and/or the step of checking 114, 114'. Therefore, TIAs that are too slow to accurately generate timestamps for all transitions can still be used in the step of performing 110 timing tests.

Figure 2C:
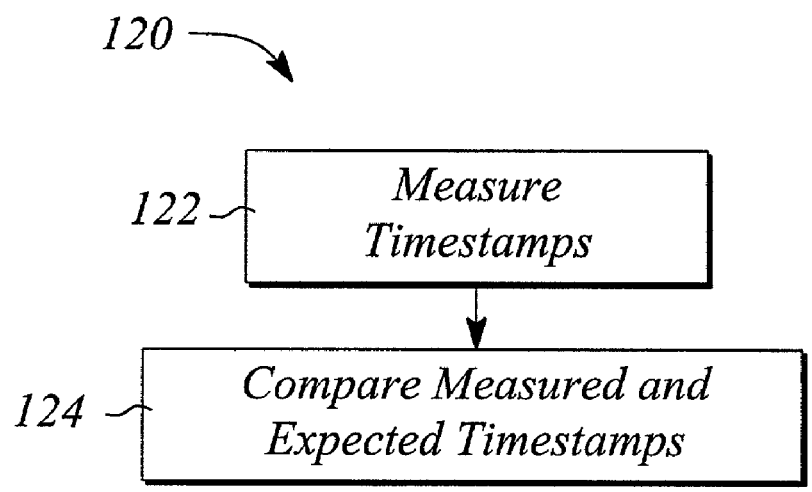
FIG. 2C illustrates a flow chart of an independent method of carrying out bit-level tests using timestamps of the present invention.

The step of carrying out 120 bit-level tests comprises the step of measuring 122 transition timestamps. The step of measuring 122 utilizes one or more TIAs to measure one or more output signals and generate one or more measured timestamps. As noted above, the step of carrying out 120 bit-level tests can be performed independently as a method 120, as illustrated in FIG. 2C. For the purposes of the invention, the description of the step of carrying out 120 bit-level tests herein is the same for the method of carrying out 120.

The step of carrying out 120 bit-level tests of the DUT produces transition timestamps for each measured signal under test or signals under test of the DUT. Moreover, the transition timestamps produced for each signal under test can be and often are independent of one another. As described hereinabove for the step of performing 110, when viewed as timestamp sequences, the transition timestamps of the step of carrying out 120, can consist either of a starting logic and a set or sequence numerical values corresponding to transition times, or can consist of a starting logic value and a record of the presence of and type of transition present during sequential sample intervals. One or more TIA(s) can be used to produce the transition timestamps in the step of carrying out 120 bit-level tests.

Unlike the transition timestamp sequences produced in the step of performing 110 timing tests, the step of carrying out 120 bit-level tests preferably produces timestamps for all transitions that occur in the output signal during a test interval or duration. However, while every transition is timestamped, the accuracy and precision of the timestamps of the step of carrying out 120 advantageously need not be as good as that of the step of performing 110. In fact, the resolution of the timestamps in the step of carrying out 120 need only have a resolution of less than one half of a minimum bit period of the signal under test. Therefore, the TIAs used for the step of carrying out 120 are referred to hereinafter as 'coarse TIAs'.

Preferably, the coarse TIAs have a resolution that is less than or equal to $\frac{1}{3}$ of the expected minimum pulse width or minimum bit period. The choice of the preferred resolution is made based on two main constraints. First, to avoid equal timestamps being assigned to two different transitions or to avoid missing transitions, the resolution should be smaller than the expected minimum pulse width. Second, to distinguish transitions indicating 'wrong bits' (i.e. bits that actually differ from their corresponding expected bits) from transitions that occur too early or too late, the resolution is preferably less than one half of a bit period, and more preferably less than or equal to $\frac{1}{3}$ of the bit period. Thus, a choice of the preferred resolution of less than or equal to $\frac{1}{3}$ of the expected minimum pulse width (or bit period) is a good one since it meets both of these constraints simultaneously. In addition, a preferred resolution of $\frac{1}{3}$ of the expected minimum pulse width is not unnecessarily demanding with respect to practical implementations. Moreover, choosing a preferred resolution of $\frac{1}{3}$ of a bit period for each timestamp, N longer bits can still be differentiated from N+1 shorter bits of the same value, as long as the drift between subsequent transitions is less than or equal to $\frac{1}{3}$ of a bit period. Choosing a finer resolution for the timestamps can increase the tolerable drift between subsequent transitions further.

With a TIA resolution of ⅓ of the minimum bit period, the coarse TIAs will be able to generate unambiguous timestamps for every transition in the output signal. The measured transition timestamps and the expected transition timestamps can be based on a common timing clock. The timing clock may or may not be related to the master clock used by the DUT to generate the signal(s) under test. However, basing the timing clock for the step of carrying out 120 on the master clock helps to insure the long-term accuracy of the measured and expected data relative to the signal under test. Alternatively, the timestamp generation might not depend on any clock.

The timestamps of the step of carrying out 120 bit-level tests can comprise a starting value followed by one or more of a sequence of numerical timestamp values, as illustrated in FIG. 1 as sequence 12 for a signal under test 10. As an alternative, the timestamp produced by the step of carrying out 120 can comprise a starting value followed by one or more of a sequence of flag values indicating the presence or absence of a transition in each of a succession of sample intervals, as illustrated in FIG. 1 as sequence 14.

For the alternative timestamp sequence form 14, the signal under test 10 is sampled at regular intervals according to the timing clock and the presence or absence of a transition within each interval can be noted and recorded. As mentioned above, the transition timestamp sequence 14 comprises a starting logic value and an array of flag values, indicating either a transition and transition type (e.g. 'R'=rising and 'F'=falling) or no transition (e.g. 'N'=no transition) for each sample interval sampled at regular intervals corresponding to a timing clock. One or more transition detectors can be used to generate the measured transition flag sequences. One skilled in the art can devise other timestamps sequence formats, all of which can be grouped into one of these two categories. All such timestamp sequences are within the scope of the present invention.

The step of carrying out 120 bit-level tests further comprises the step of comparing 124 measured timestamps to expected timestamps. The step of comparing 124 can either be done on a timestamp-by-timestamp basis or at the sequence level. At the sequence level, a measured timestamp sequence is compared with an expected timestamp sequence. However, the step of comparing 124 is preferably accomplished on a timestamp-by-timestamp basis. In the preferred embodiment, a measured timestamp is generated by the step of measuring 122 and then immediately compared 124 to a corresponding expected timestamp. The steps of measuring 122 and comparing 124 are repeated iteratively for each transition in the signal under test in this preferred embodiment.

The step of comparing 124 is used to determine whether the DUT is operating according to specifications. In the simplest form, the step of comparing 124 essentially determines whether all expected transitions are present in the measured transition timestamp sequence. In addition, a determination can be made regarding whether the timing between transitions is within specifications.

During the step of comparing 124 the measured and expected timestamps, one of the most basic comparisons is the determination of whether the starting values and all time intervals between subsequent transitions of the measured sequence and the expected sequence are equal within the TIA resolution (e.g. less than ½ of a bit period). If the starting values match and all time intervals between subsequent transition timestamps match (e.g. preferably ≦⅓), the timestamp sequences indicate an operational DUT. In other words, the basic comparison indicates that all bits are definitively received as expected and that an incremental drift or drift difference between two consecutive transitions is less than the TIA resolution.

However, when the tolerable drift difference between two very distant transitions is more than the TIA resolution (e.g. greater that ⅓ bit period for a TIA resolution of ⅓ of a bit period), the step of carrying out 120 bit-level tests has trouble differentiating between N medium-long bits of the same value, or N−1 long bits, or N+1 short bits of the same value. In most cases, an incorrect bit will be detected or can be differentiated because it changes in the following time interval. For the rare cases where the differentiation cannot be guaranteed, a 'No Coverage Warning' can be generated as detailed below or the design of the DUT can sometimes be modified to force a transition before the tolerable drift margin reaches the TIA resolution.

Beyond the basic comparison in the step of comparing 124 described hereinabove, several specific comparisons associated with several specific bit-level tests can be performed to detect several different types of potential faults in accordance with the present invention. In particular, specific comparisons can indicate the presence of a so-called 'Skew Fault', a 'Bit Fault', and a 'Drift Fault', as further described hereinbelow.

Figure 3A:
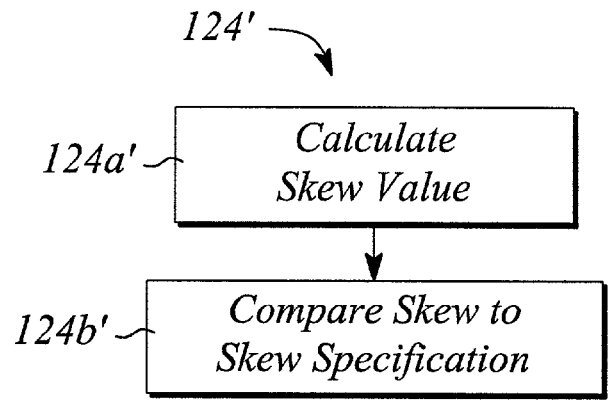
FIG. 3A illustrates a flow chart of one embodiment of a step of comparing according to the present invention in FIGS. 2A and 2C that detects and indicates a Skew Fault.

FIG. 3A illustrates a flow chart of the step of comparing 124' to detect a Skew Fault. The step of comparing 124' comprises the step of calculating 124a' a skew value. The step of calculating 124' a skew value comprises computing the difference between the expected timestamp and the measured timestamp. For example, consider a measured timestamp sequence having an i-th timestamp $t_i$ corresponding to an i-th transition. Moreover assume that an expected timestamp sequence exists having a corresponding i-th timestamp $T_i$. The step of calculating 124a' subtracts $T_i$ from $t_i$ yielding an i-th skew $S_i$. The step of comparing 124' further comprises the step of comparing 124b' the skew $S_i$ to a specified maximum skew value $S_{max}$. If the absolute value of skew $S_i$ is greater than the maximum skew $S_{max}$, a Skew Fault is indicated. The maximum skew $S_{max}$ is a specified value derived from the DUT specification. One skilled in the art would readily be able to derive a suitable maximum skew $S_{max}$ given the DUT specifications without undue experimentation.

Figure 3B:
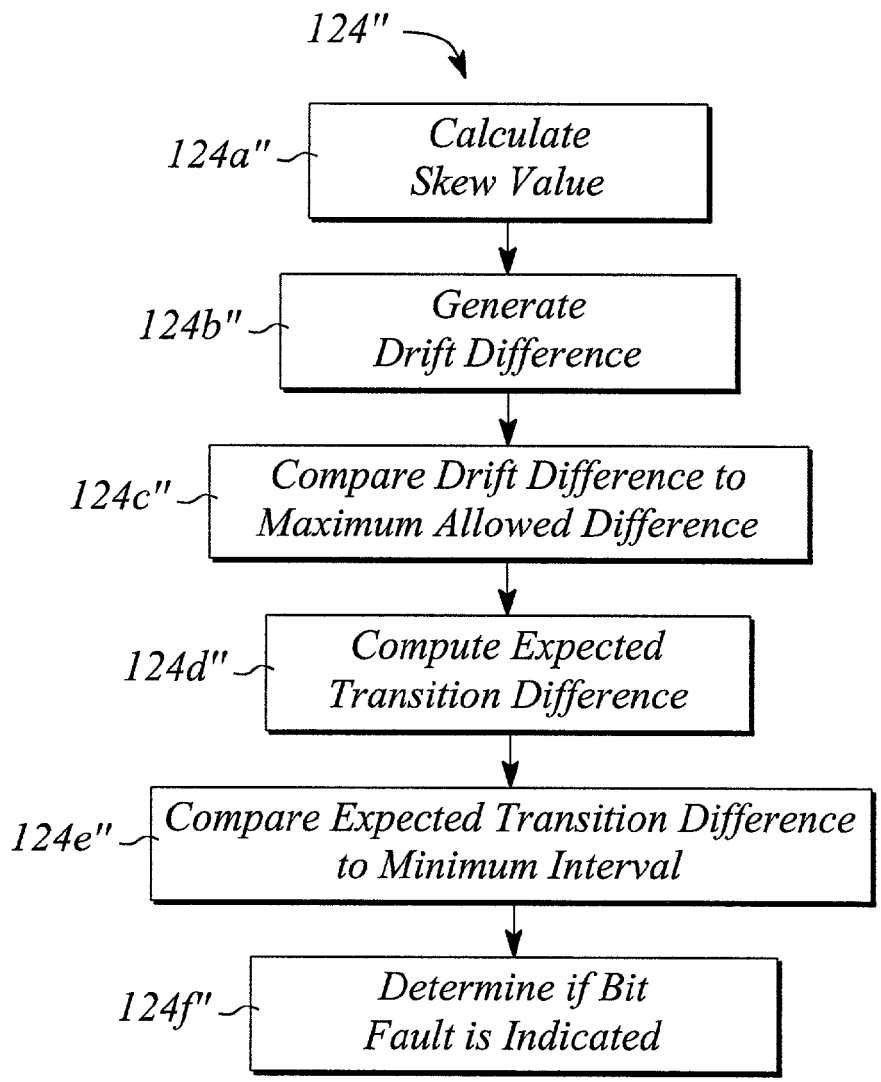
FIG. 3B illustrates a flow chart of one embodiment of a step of comparing according to the present invention in FIGS. 2A and 2C that detects and indicates a Bit Fault.

FIG. 3B illustrates a flow chart of the step of comparing 124" to detect a Bit Fault. The step of comparing 124" comprises the step of calculating 124a" a skew value. The step of calculating 124a" a skew value comprises computing the difference between the timestamp $T_i$ of the expected timestamp sequence and the timestamp $t_i$ of the measured timestamp sequence to generate the skew value $S_i$. The step of calculating 124a" is essentially identical to the step of calculating 124a'. The step of comparing 124" further comprises the step of generating 124b" a drift difference (i.e. the incremental drift since the last transition) $D_i$ by subtracting a previous skew value $S_{i-1}$ from the skew value $S_i$. The step of comparing 124" still further comprises the step of comparing 124c" the drift difference $D_i$ to a maximum allowed difference $D_{max}$.

In a preferred embodiment, the maximum allowed difference $D_{max}$ is determined from the timestamp resolution, such that a wrong bit can be differentiated from tolerable drift. In general, two times the maximum allowed difference $D_{max}$ should be less than one bit period. In other words, the maximum allowed difference $D_{max}$ should be equal to the TIA or timestamp resolution or an integer multiple of the timestamp resolution. For example, the maximum allowed difference $D_{max}$ should equal ⅓ when using 3 samples per bit period; the maximum allowed difference $D_{max}$ should equal 3/7 when using 7 samples per period; and the maximum allowed difference $D_{max}$ should equal 3/8 when using 8 samples per period.

In another embodiment, the maximum allowed difference $D_{max}$ is variable and can be changed on a bit by bit basis or even a sub-bit basis. For example, the maximum allowed difference $D_{max}$ may be set equal to ten bit periods until a particular set of bits is encountered. After encountering the set of bits, the maximum allowed difference $D_{max}$ may be set to a different value, say 1/3 bit period. In another example, the maximum allowed difference $D_{max}$ is set to a different value during each bit period. In yet another example, $D_{max}$ is changed at a rate equal to the timestamp resolution.

The step of comparing 124″ further comprises the step of computing 124d″ an expected transition difference $\Delta T_i$. The transition difference is the difference between an i-th timestamp $T_i$ of the expected timestamp sequence and a previous timestamp $T_{i-1}$ of the expected timestamp sequence. The step of comparing 124″ still further comprises the step of comparing 124e″ the expected transition difference $\Delta T_i$ to a minimum interval $T_{Dmax}$ for which a drift of up to the maximum allowed drift $D_{max}$ can be tolerated. The minimum interval $T_{Dmax}$ is readily determined from the DUT specification by one skilled in the art.

The step of comparing 124″ yet still further comprises the step of determining 124f″ if a Bit Fault is indicated. If the absolute value of the drift difference $D_i$ is greater than the maximum allowed difference $D_{max}$ and the expected transition difference $\Delta T_i$ is less than the minimum interval $T_{Dmax}$, then a Bit Fault is indicated by the step of comparing 124″.

Figure 3C:
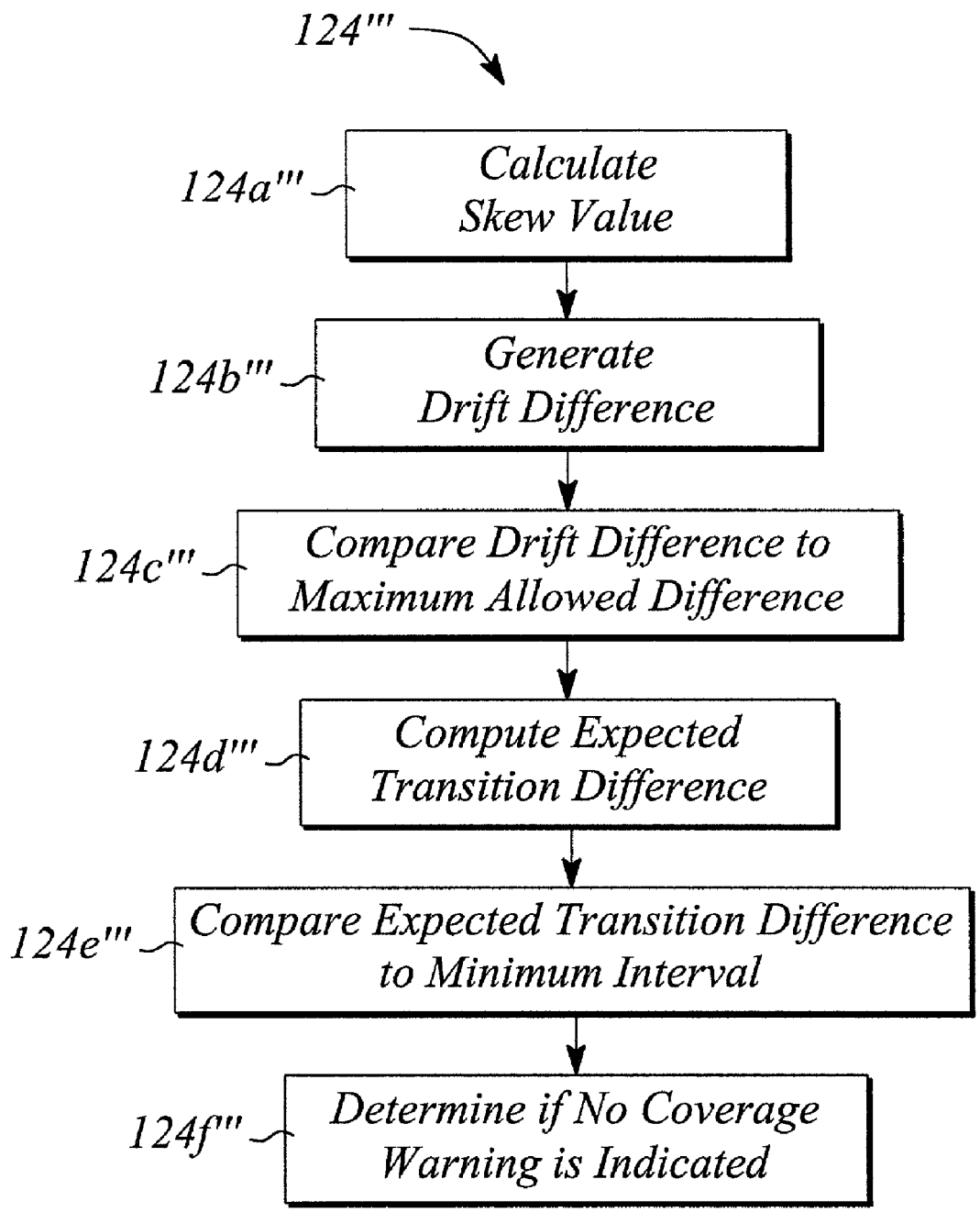
FIG. 3C illustrates a flow chart of one embodiment of a step of comparing according to the present invention in FIGS. 2A and 2C that detects and indicates a No Coverage Warning.

FIG. 3C illustrates a flow chart of the step of comparing 124‴ to detect situation in which a No Coverage Warning is indicated. The No Coverage Warning is essentially a warning that if a fault occurs during an interval in which a No Coverage Warning is indicated, the fault may not be detected (i.e. the fault may be missed). The step of comparing 124‴ comprises the step of calculating 124a‴ a skew value $S_i$ by computing the difference between the timestamp $T_i$ of the expected timestamp sequence and the timestamp $t_i$ of the measured timestamp sequence. The step of calculating 124a‴ is essentially identical to the steps of calculating 124a′ and 124a″. The step of comparing 124‴ further comprises the step of generating 124b‴ a drift difference $D_i$ and the step of comparing 124c‴ the drift difference $D_i$ to the maximum allowed difference $D_{max}$. The step of comparing 124‴ still further comprises the step of computing 124d‴ an expected transition difference $\Delta T_i$ and the step of comparing 124e‴ the expected transition difference $\Delta T_i$ to the a minimum interval $T_{Dmax}$. The steps 124b‴, 124c‴, 124d‴, and 124e‴ are essentially identical to the steps 124b″, 124c″, 124d″, and 124e″, respectively of the step of comparing 124″. The step of comparing 124‴ yet still further comprises the step of determining 124f‴ if a No Coverage Warning is indicated. If the absolute value of the drift difference $D_i$ is greater than the allowed maximum difference $D_{max}$ and the expected transition difference $\Delta T_i$ is greater than the interval $TD_{max}$, then a No Coverage Warning is indicated by the step of comparing 124‴.

Figure 3D:
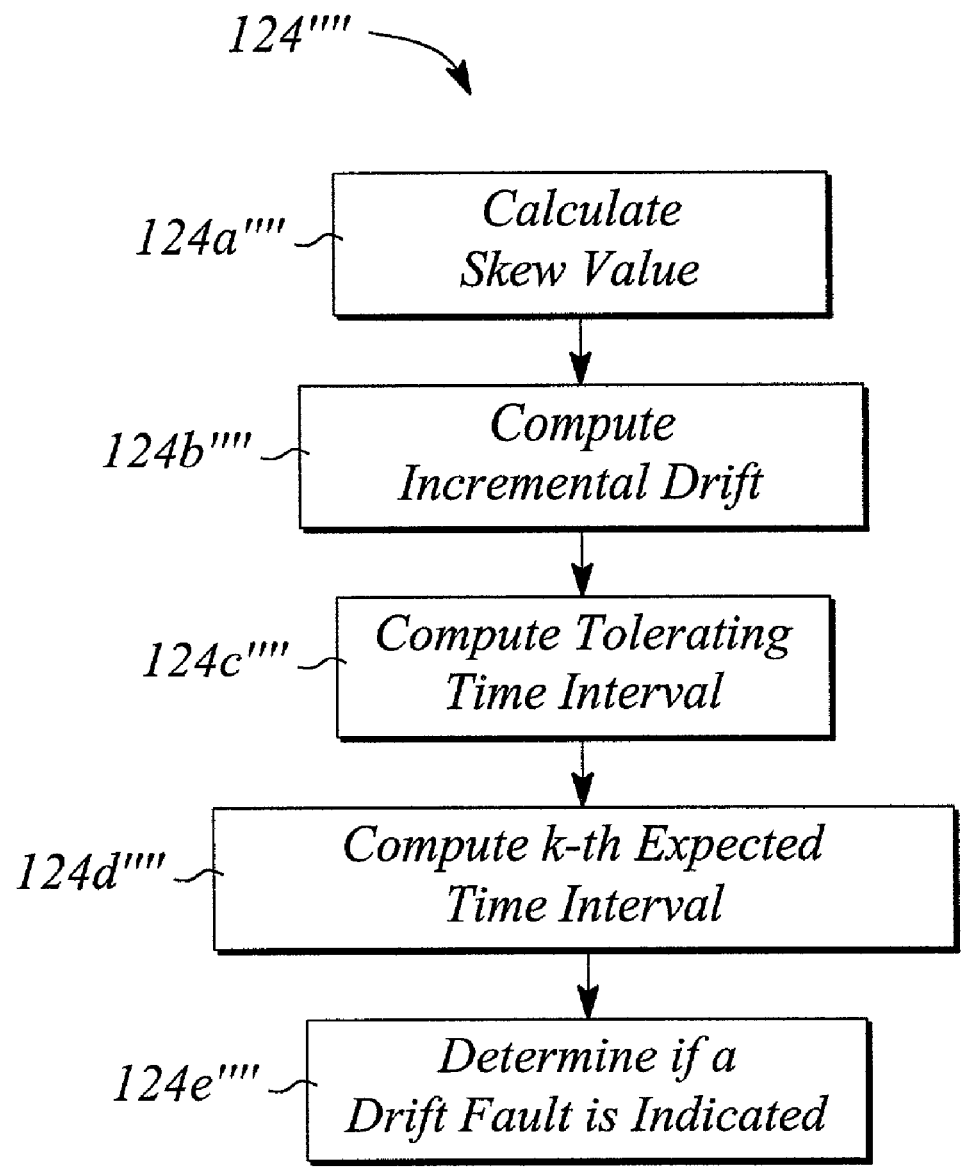
FIG. 3D illustrates a flow chart of one embodiment of a step of comparing according to the present invention in FIGS. 2A and 2C that detects and indicates a Drift Fault.

FIG. 3D illustrates a flow chart of the step of comparing 124″″ to detect a Drift Fault. The step of comparing 124″″ comprises the step of calculating 124a″″ the skew value $S_i$ by computing the difference between the timestamp $T_i$ of the expected timestamp sequence and the timestamp $t_i$ of the measured timestamp sequence. The step of calculating 124a″″ is essentially identical to the steps of calculating 124a′, 124a″, described hereinabove. The step of comparing 124″″ further comprises the step of computing 124b″″ a k-th drift difference $D_{i,k}$. The k-th drift difference $D_{ik}$ is the difference between the i-th skew value $S_i$ and a k-th previous skew value $S_{i-k}$ and represents the incremental drift within the last k transitions. The step of comparing 124″″ still further comprises the step of computing 124c″″ a tolerating time interval $g(D_{ik})$ needed to tolerate the actual drift, where $g(\bullet)$ is a function given by equations (3) and (4) described in detail hereinbelow. The step of comparing 124″″ yet still further comprises the step of computing 124d″″ a k-th expected transition difference $\Delta T_{ik}$ for a k-th previous transition. The k-th expected transition difference $\Delta T_{ik}$ is the difference between the i-th expected timestamp $T_i$ and a k-th previous expected timestamp $T_{i-k}$. The step of comparing 124″″ still further comprises the step of determining 124e″″ if a Drift Fault is indicated. The step of determining 124e″″ comprises comparing the k-th expected transition difference $\Delta T_{ik}$ to the tolerating time interval $g(D_{ik})$ needed to tolerate the actual drift. If the tolerating time interval $g(D_{ik})$ is greater than the k-th expected transition difference $\Delta T_{ik}$, a Drift Fault is indicated by the step of comparing 124″″.

Figure 4:
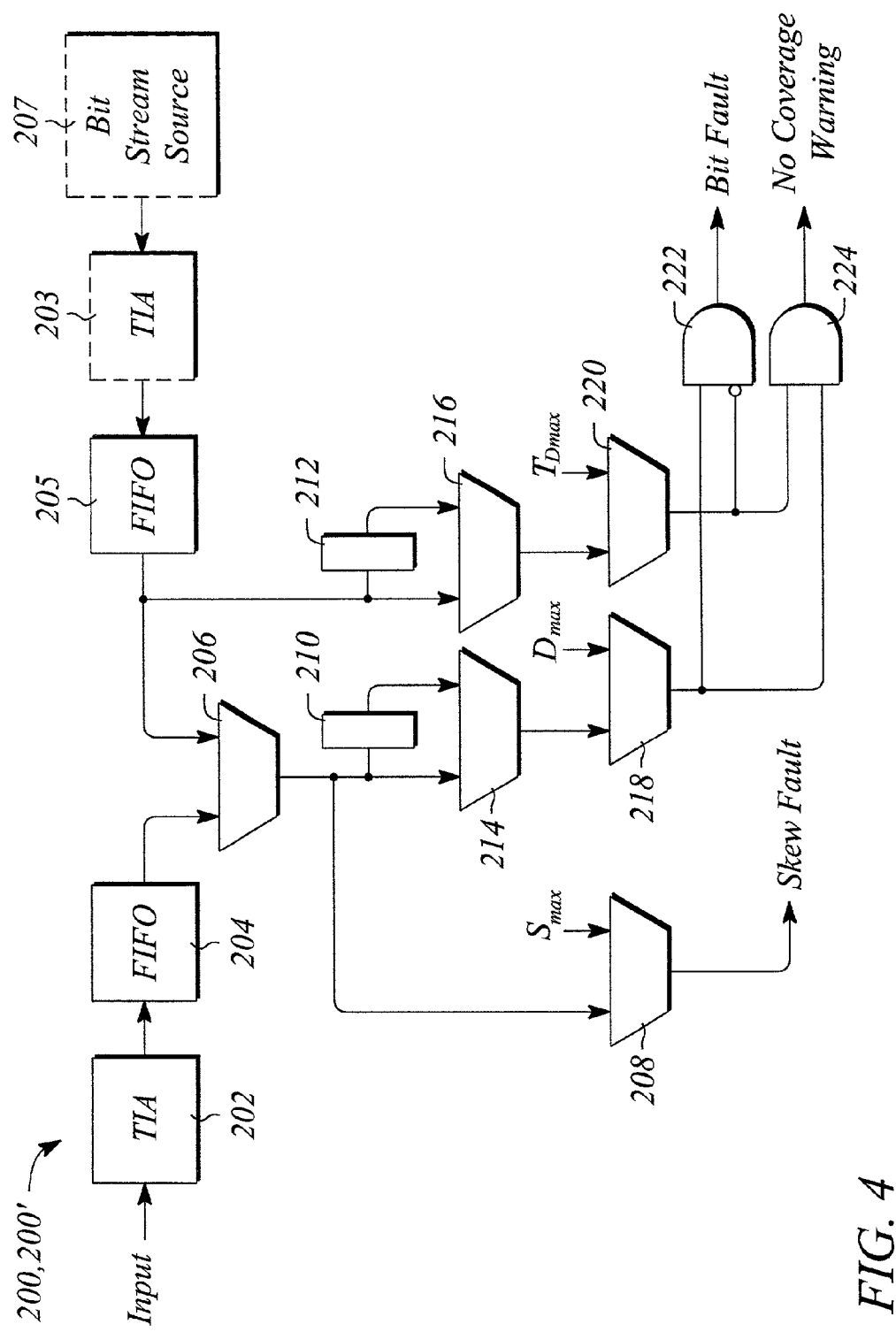
FIG. 4 illustrates a schematic block diagram of an apparatus for generating and comparing timestamps sequences according to the present invention.

In another aspect of the invention, an apparatus 200, 200′ for generating and comparing timestamps from an output signal of a DUT to an expected timestamp for the output signal is provided. A block diagram of the apparatus 200, 200′ of the present invention is illustrated in FIG. 4. The apparatus 200 comprises a first coarse TIA 202 and a first, first-in-first-out (FIFO) 204 memory or buffer. The coarse TIA 202 assigns a measured transition timestamp $t_i$ to each logic transition detected in the output signal, where i is an index of the timestamp value. In addition to including a coarse time at which a given transition occurred, the timestamp $t_i$ generated by the coarse TIA 202 also includes a plurality of bits that can be set by the TIA 202 to indicate the presence of multiple transitions within one bit period. At least two bits are used to indicate the presence of transitions in a first or second portion of the bit period. Preferably, three bits are used to indicate the presence of transitions in a first, second or third portion of the bit period when using triple rate sampling as the TIA resolution. These bits are called 'subperiod transition bits' or simply 'SPT bits'. The first FIFO 204 temporarily stores in a first-in, first-out manner, one or more of the transition timestamp values generated by the TIA 202 before the processing equipment that follows the FIFO 204 needs them.

The apparatus 200 further comprises a second coarse TIA 203, a second FIFO 205, and a bit stream source 207. The second TIA 203 samples an expected bit stream from the bit stream source 207 and assigns a time of occurrence to generate an expected timestamp $T_i$ for each logic transition detected in the expected bit stream signal where i is an index of the timestamp value. The second FIFO 205 temporarily stores, in a first-in, first-out manner, one or more of the transition values generated by the TIA 203. The expected bit stream signal produced by the bit stream source 207 is generated from information regarding the DUT and represents the signal that should be produced by a properly operating DUT. The bit stream source 207 is often a portion of a conventional ATE.

In another embodiment of the apparatus 200′, the second TIA 203 is omitted and the expected bit stream is replaced by an expected timestamp sequence. The TIA 203 and bit stream source 207 are illustrated in dashed-line boxes in FIG. 4 for this reason. In a typical ATE or similar test system, the expected bit stream is generated before a test and stored in memory. In the alternate embodiment of apparatus 200′, the expected transition timestamp sequence or the expected bit stream is stored in ATE memory instead. One skilled in the art would readily realize that of these two embodiments of the apparatus 200, 200', the apparatus 200' is somewhat more general and more capable since it can describe arbitrary digital waveforms and is not restricted to digital signals that are defined as a bit stream with equal bit period.

The apparatus 200, 200' further comprises a first subtractor 206 and a Skew Fault detection circuit comprising a first comparator 208. When both FIFOs 204, 205 contain at least one entry, a first measured timestamp value in the FIFO 204 is transferred to a subtrahend input of the first subtractor 206, while a first expected timestamp value in the FIFO 205 is transferred to a minuend input of the first subtractor 206. In the preferred embodiment of the apparatus 200, 200' the timestamp value is divided into two parts, one part based on a count of the number of timing clock cycles and a second part that encodes the location of the transition within the clock cycle. The expected timestamp value $T_i$ is subtracted from the measured timestamp value $t_i$ to yield a value for the skew value $S_i$ or total skew between the two timestamps (i.e. $S_i=t_i-T_i$) at an output of the first subtractor 206. The comparator 208 is connected to the output of the first subtractor 206 and compares the skew value $S_i$ to a skew error margin or maximum skew $S_{max}$ and generates an error signal Skew Fault, indicating the detection of a Skew Fault when the absolute value of $S_i$ is larger than the maximum skew $S_{max}$. The maximum skew $S_{max}$ is a value readily derived by one skilled in the art from the specifications for the DUT. After a time that is sufficient to do all processing for the current transition pair, but no longer than the average time between transitions (to prevent overflow), a next transition event is generated. The next transition event clocks registers in the Bit Fault circuit and the No Coverage Warning circuit, and clears the entry of FIFO 205. When the current entry of FIFO 204 has only one SPT bit set, the current entry of FIFO 204 is also cleared. In the case when multiple SPT bits are set, a next transition timestamp is generated and the timestamp is not cleared from the FIFO 204. After the last transition has been used for comparison, the entry in FIFO 204 will finally be cleared. In another embodiment, the apparatus 200, 200' still further comprises a Bit Fault detection circuit, a No Coverage Warning detection circuit and a pair of AND gates 222, 224.

The Bit Fault circuit comprises a first latch or register 210 and the No Coverage Warning circuit comprises a second latch or register 212. The first latch 210 has an input connected to the output of the first subtractor 206 and records and holds the total skew $S_i$ each time a transition trigger is generated. An output of the first latch 210 is a previous total skew $S_{i-1}$ of a previous subtraction by the first subtractor 206. Similarly, an input of the second latch 212 is connected to the second FIFO 205, such that the second latch 212 records and holds the expected timestamp $T_i$ each time a transition trigger is generated. An output of the second latch 212 is a previous expected timestamp $T_{i-1}$.

The Bit fault circuit further comprises a second subtractor 214 and the No Coverage Warning circuit further comprises a third subtractor 216. A subtrahend input of the second subtractor 214 receives the skew value $S_i$, while a minuend input receives the previous skew value $S_{i-1}$ from the first latch 210. The second subtractor 214 subtracts the previous skew value $S_{i-1}$ from the skew value $S_i$ to yield the drift difference $D_i$ (i.e. drift difference as described in FIGS. 3B and 3C) at an output of the second subtractor 214. A subtrahend input of the third subtractor 216 receives the expected timestamp $T_i$ while a minuend input receives the previous expected timestamp $T_{i-1}$ from the second latch 212. The third subtractor 216 subtracts the previous expected timestamp $T_{i-1}$ from expected timestamp $T_i$ to yield an expected transition difference $\Delta T_i$ (i.e. from description of FIGS. 3B and 3C) at an output of the third subtractor 216.

The Bit Fault circuit still further comprises a second comparator 218 and the No Coverage Warning circuit still further comprises a third comparator 220. The second comparator 218 compares the drift difference $D_i$ from the second subtractor 214 to the maximum allowed difference $D_{max}$. If the absolute value of the drift difference $D_i$ is greater than the maximum allowed difference $D_{max}$, then the second comparator 218 produces a logic high value at an output. Otherwise the output of the second comparator 218 is a logic low. The third comparator 220 compares the expected transition difference $\Delta T_i$ from the third subtractor 216 to a minimum interval $T_{Dmax}$ value during which it is tolerable that the drift difference $D_i$ reaches or exceeds the maximum allowed difference $D_{max}$. The third comparator 220 produces a logic high when the expected transition difference $\Delta T_i$ is greater than the minimum interval $T_{Dmax}$ value. Otherwise the output logic value of the third comparator 220 is a logic low. The maximum allowed difference $D_{max}$ depends on the resolution of the TIA as described hereinabove. For example, if a coarse TIA sampling at 3 times the minimum bit period is used, the value of the maximum allowed difference $D_{max}$ is preferably ⅓ of the minimum bit period. The minimum interval $T_{Dmax}$ value is derived from the specifications for the DUT and signal under test as described hereinabove. One skilled in the art would be able to derive the values without undue experimentation.

As described above for the method 100, a Bit Fault is defined as the situation when the absolute value of the drift difference $D_i$ is greater than the maximum allowed difference $D_{max}$ and the expected transition difference $\Delta T_i$ is less than the minimum interval $T_{Dmax}$. Similarly, a No Coverage Warning is generated in the situation when the absolute value of the drift difference $D_i$ exceeds the maximum allowed difference $D_{max}$ and the expected transition difference $\Delta T_i$ is greater than the minimum interval $T_{Dmax}$. In other words, a Bit Fault signal, indicating the detection of a Bit Fault, is the output logic value of the second comparator 218 logically 'anded' with the logical inverse of the output logic value of the third comparator 220 with the AND gate 222. The No Coverage Warning signal, indicating the detection of a No Coverage Warning, is the output logic value of the second comparator 218 logically 'anded' with the output logic value of the third comparator 220 with the AND gate 224.

To deal with clock-level uncertainties, such as synchronization uncertainties between multiple clock domains, the normally fixed maximum allowed difference $D_{max}$ to which the drift difference $D_i$ is compared in the second comparator 218 can be replaced by a variable value that is associated with the expected transition timestamp $T_i$. In this case, an individual test margin value (or an index to a lookup table) is propagated along with the expected transition timestamp $T_i$ to allow for a 'transition-specific relaxed test margin'.

In yet another aspect of the invention, the drift difference between distant transitions can be used to test a DUT for large long-term drift. The term 'distant transitions' as used herein refers to transitions in the input signal that are separated in time by several transitions. The drift difference test is based on the formula of equation (1).

$$D_{ik}/\Delta T_{ik} < f_{drift}(\Delta T_{ik}) \quad (1)$$

where $$\Delta T_{ik} = T_i - T_{i-k}$$

$$S_i = t_i - T_i$$

$$D_{ik} = S_i - S_{i-k}$$

and where, as hereinabove, $t_i$ denotes the timestamp value of the i-th transition of the DUT and $T_i$ is the expected timestamp of the i-th transition. Also as used hereinabove, $S_i$ is the skew value of i-th transition, $D_{ik}$ is the k-th drift difference between i-th transition and transition i-k. The quantity $f_{drift}(\Delta T)$ is the tolerable drift as a function of the elapsed time between transitions. The tolerable drift $f_{drift}(\Delta T)$ is closely related to a spectral jitter specification, which specifies the tolerable jitter as a function of frequency.

In practice, the values observed for the k-th drift difference $D_{ik}$ can be represented by small, bounded numbers while the values of the quantities of the k-th expected transition difference $\Delta T_{ik}$ can be very large. Therefore, it is generally easier to implement the test, based on the following, formula of equation (2):

$$g(D_{ik}) < \Delta T_{ik} \quad (2)$$

where $$g(D_{ik}) = h^{-1}(D_{ik}) \quad (3)$$

$$h(D_{ik}) = f_{drift}(D_{ik}) \cdot D_{ik} \quad (4)$$

Figure 5:
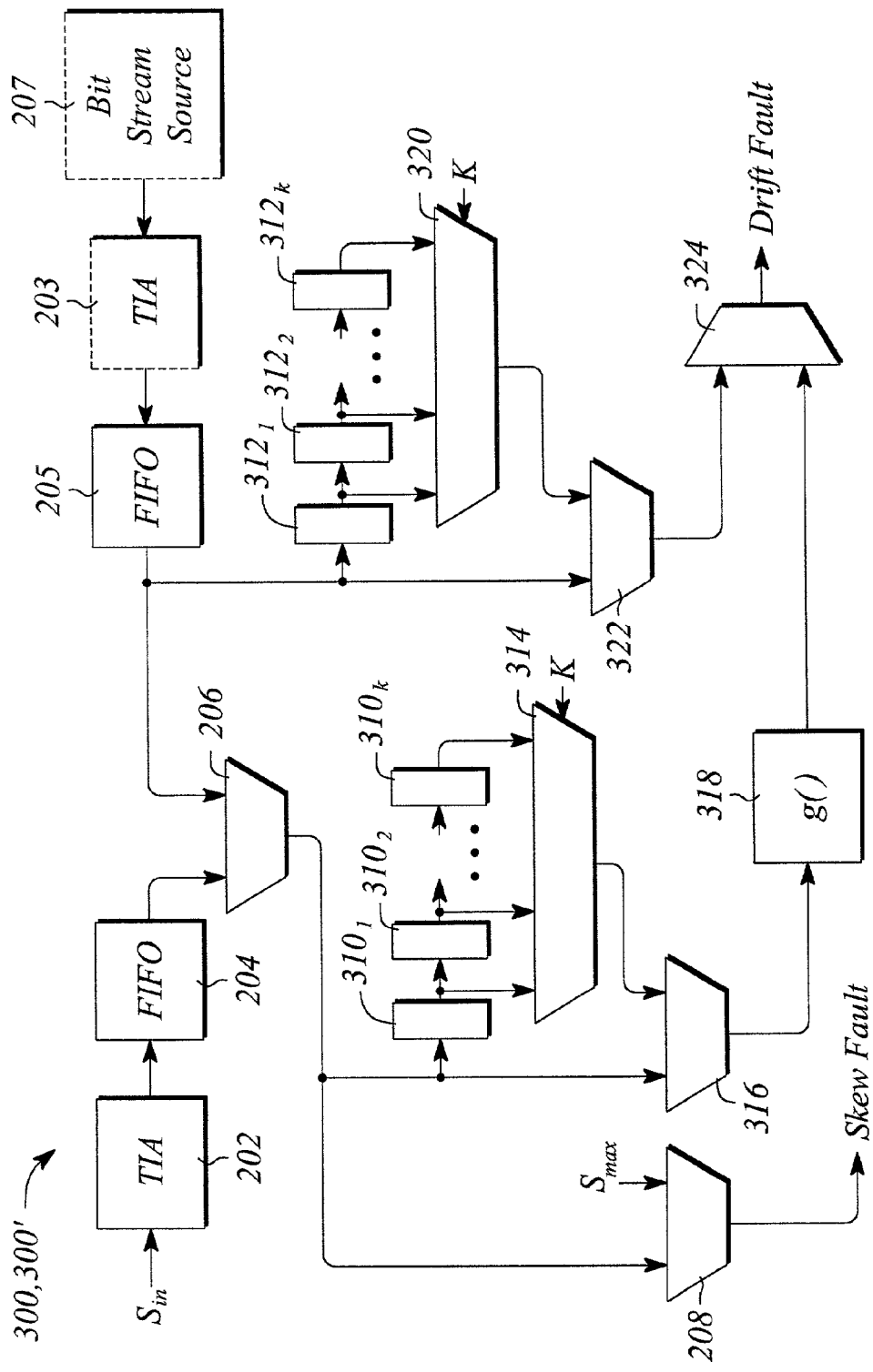
FIG. 5 illustrates a schematic block diagram of an apparatus for detecting a Skew Fault and a Drift Fault according to the present invention.

In this aspect of the invention, an apparatus 300, 300' for detecting and indicating a Drift Fault is provided. A block diagram of the apparatus 300, 300' is illustrated in FIG. 5. The apparatus 300 comprises the first and second TIAs 202, 203, the first and second FIFOs 204, 205, the bit stream source 207, the first subtractor 206, and the Skew Fault detection circuit comprising the first comparator 208 of the apparatus 200. The operation of and functional relationship between the TIAs 202, 203, the first and second FIFOs 204, 205, the bit stream source 207, the first subtractor 206, and the first comparator 208 of the apparatus 300 are identical to that described hereinabove for apparatus 200. Similarly, as with apparatus 200', an alternate apparatus 300' that substitutes a directly generated expected timestamp sequence for that generated by the bit stream source 207 and second TIA 203 is provided. In the apparatus 400', the TIA 203 and the bit stream source 207 are omitted (illustrated in FIG. 5 with dashed-line boxes for that reason). As such, the apparatus 300, 300' can detect a Skew Fault, as described above for apparatus 200, 200'. However different from apparatus 200, 200', the apparatus 300, 300' further comprises Drift Fault circuitry that detects and indicates a Drift Fault, as opposed to the embodiments comprising Bit Fault and No Coverage Warning circuitry described above for apparatus 200, 200'.

The Drift Fault circuitry of the apparatus 300, 300' comprises a drift difference circuit for measuring a tolerable drift that comprises a first set of k latches or preferably registers 310, a first k-to-1 multiplexer 314, a second subtractor 316, and a memory 318. A first latch $310_1$ of the first set of latches 310 accepts a signal from the output of the first subtractor 206. An output of the first latch $310_1$ is connected to an input of a second latch $310_2$ of the first set of latches 310 and to a first input of the multiplexer 314. An output of the second latch $310_2$ is likewise connected to an input of a third latch $310_3$ and to a second input of the multiplexer 314. This pattern of latch/multiplexer input and output connections is repeated until the k-th latch $310_k$. An output of the k-th latch $310_k$ is connected to a k-th input of the multiplexer 314. All latches 310 are clocked upon a next transition event. The multiplexer 314 selects one of the k input signals according to a selection input K and produces a selected skew value $S_{i-k}$ at an output port. The selected skew value $S_{i-k}$ is the skew value measured from k samples prior to the i-th or current sample.

A subtrahend input of the second subtractor 316 accepts a skew value $S_i$ from the output of the first subtractor 206. A minuend input of the second subtractor 316 accepts the output selected skew value $S_{i-k}$ from the first multiplexer 314. An output of the second subtractor 316 represents the k-th drift difference $D_{ik}$ between transitions i and i-k. An output of the second subtractor 316 is connected to an input of the memory 318. The memory 318 is a look-up table that represents or implements the function g(•) of equation (3). The memory 318 produces an output corresponding to the tolerating time interval $g(D_{ik})$.

The Drift Fault circuitry of the apparatus 300, 300' further comprises a transition difference circuit for measuring the k-th expected transition difference that comprises a second set of k latches 312, a second k-to-1 multiplexer 320, and a third subtractor 322. The Drift Fault circuitry still further comprises a second comparator 324. A first latch $312_1$ of the second set of latches 312 accepts a signal from the output of the second FIFO 205. An output of the first latch $312_1$ is connected to an input of a second latch $312_2$ of the second set of latches 312 and to a first input to the multiplexer 420. An output of the second latch $312_2$ is likewise connected to an input of a third latch $312_3$ and to a second input of the multiplexer 420. This pattern of latch/multiplexer input and output connections is repeated until the k-th latch $312_k$. An output of the k-th latch $312_k$ is connected to a k-th input of the multiplexer 314. The multiplexer 314 selects one of the k input signals according to a selection input K and outputs the selected signal, the k-th previous expected timestamp $T_{i-k}$, at an output port. The k-th previous expected timestamp $T_{i-k}$ is the expected transition timestamp from k samples prior to the i-th or current expected transition timestamp $T_i$.

A subtrahend input of the third subtractor 322 accepts an expected transition timestamp $T_i$ from the output of the second FIFO 205. A minuend input of the third subtractor 322 accepts the k-th previous expected timestamp $T_{i-k}$ of the second multiplexer 320. An output of the third subtractor 322 represents the k-th expected transition difference $\Delta T_{ik}$ between expected transitions i and i-k. The k-th expected transition difference $\Delta T_{ik}$ is compared by the second comparator 324 to the memory 318 output representing the tolerating time interval $g(D_{ik})$. A Drift Fault signal, indicating the detection of a Drift Fault, is generated by the second comparator 324 if the tolerating time interval $g(D_{ik})$ is more than the k-th expected transition difference $\Delta T_{ik}$ according to equation (2).

As described hereinabove, the coarse timestamp generator or coarse TIA 202 of the apparatus 200, 200' and apparatus 300, 300' of the present invention assigns timestamps to all transitions in the measured output signal. In order to make sure that all transitions of the output signal of the DUT are timestamped and not skipped unintentionally, the output signal is sampled more often than the minimum pulse width. Assuming a non-return to zero (NRZ) signal for the output signal, this means that the signal is preferably sampled more often than the shortest bit period. More preferably, the sampling should be done at least three times per bit period of the output signal.

Figure 6A:
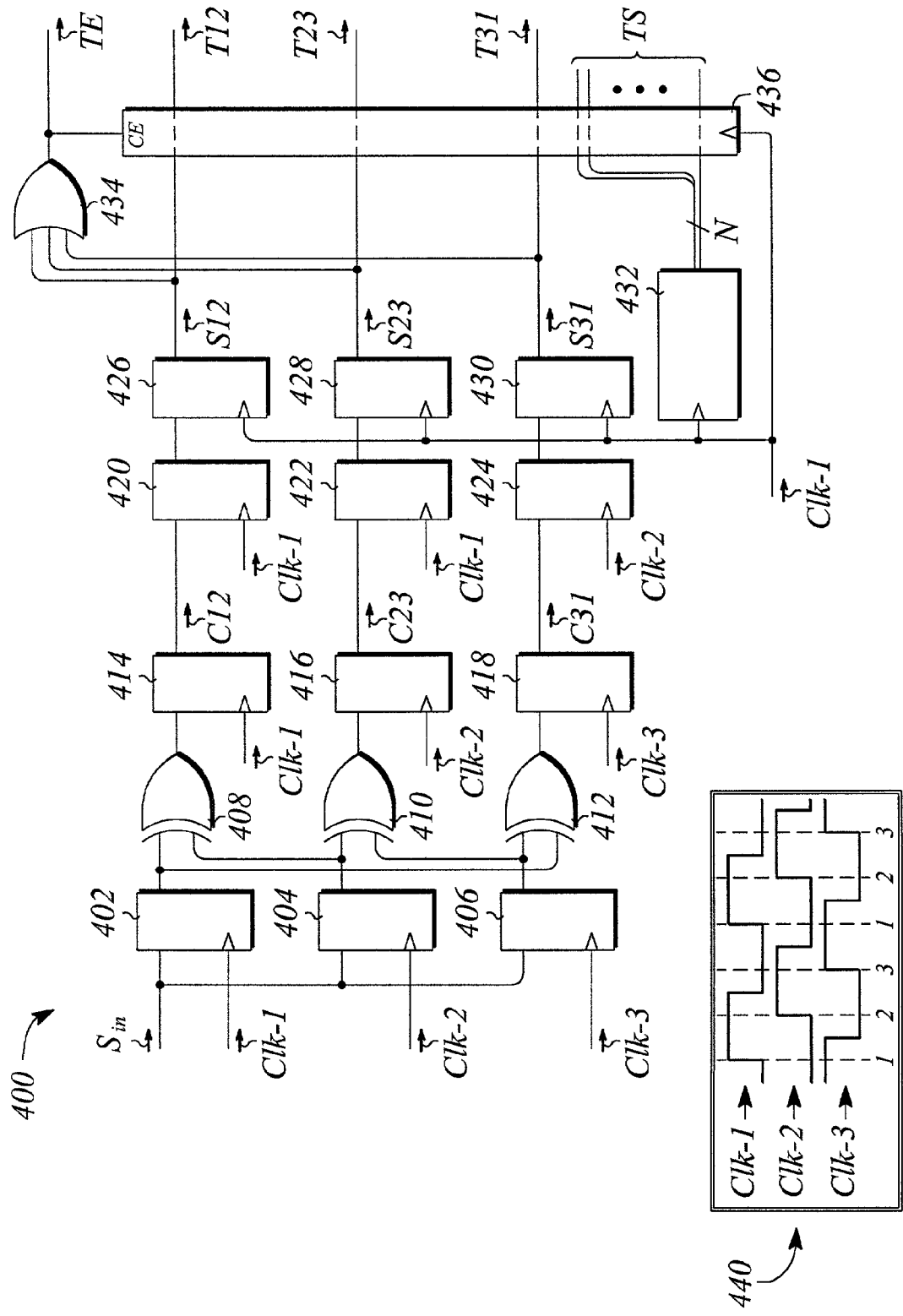
FIG. 6A illustrates a schematic block diagram of an apparatus for synchronous coarse timestamp generation according to the present invention.

In yet another aspect of the invention, an apparatus 400 for coarse timestamp generation is provided. A block diagram of the apparatus 400 referred to herein as a 'synchronous coarse timestamp generator' is illustrated in FIG. 6A. The block diagram of FIG. 6A is one example of how apparatus 400 may be implemented. Further, the 'synchronous generator' apparatus 400 is one way according to the invention that the coarse TIA 202 may be implemented in the apparatuses 200, 200', 300, 300'. The apparatus 400 for coarse timestamp generation comprises a plurality of M generator circuits that is clocked by a plurality of M clock signals, where M is greater than two. FIG. 6A illustrates the apparatus 400 with a first, second and third generator circuits for the preferred plurality of M=3 generator circuits. The generator circuits comprise the same components and operate in parallel. The generator circuits are described below in combination.

The generator circuits of the apparatus 400 for coarse timestamp generation illustrated in FIG. 6A each comprise a first clocked flip-flop 402, 404, 406, an exclusive-OR gate 408, 410, 412, a second flip-flop 414, 416, 418, a third flip-flop 420, 422, 424, and a fourth flip-flop 426, 428, 430. Each generator circuit has a signal input, a clock input and a generator circuit output. The signal input of the generator circuit is connected to a data input of the first flip-flop 402, 404, 406. The clock input of the generator circuit is connected to a clock input of the first flip-flop 402, 404, 406 and the second flip-flop 414, 416, 418. An output of the first flip-flop 402, 404, 406, is connected to a first input of the exclusive-OR gate 408, 410, 412. An output of the exclusive-OR gate 408, 410, 412 is connected to a data input of the second flip-flop 414, 416, 418. An output of the second flip-flop 414, 416, 418 is connected to a data input of the third flip-flop 420, 422, 424, while a data output of the third flip-flop 420, 422, 424 is connected to a data input of the fourth flip-flop 426, 428, 430.

An input signal $S_{in}$ containing transitions to be timestamped is applied to signal input of the first, second and third generator circuits. A first clock signal Clk-1 is applied to the clock input of the first generator circuit. A second clock signal Clk-2 is applied to the clock input of the second generator circuit. A third clock signal Clk-3 is applied to the clock input of the third generator circuit. The first clock signal Clk-1 is also applied to a clock input of the third flip-flop 420 of the first generator circuit and to a clock input of the third flip-flop 422 of the second generator circuit. The second clock signal Clk-2 is also applied to a clock input of the third flip-flop 424 of the third generator circuit. The first clock signal Clk-1 is also applied to a clock input of the fourth flip-flop 426, 428, 430 of each of the generator circuits.

The first clock signal Clk-1, the second clock signal Clk-2 and the third clock signal Clk-3 are time delayed relative to each other by 1/M, while having the same clock frequency and clock period, or preferably ⅓ of the clock period for the embodiment illustrated in FIG. 6A. In other words, a rising edge of the first clock signal Clk-1 precedes a rising edge in the second clock signal Clk-2 by ⅓ of the clock period. Similarly, a rising edge of the second clock signal Clk-2 precedes a rising edges in the third clock signal Clk-3 by ⅓ of the clock period. The relationship between the clock signal timing of the first clock signal Clk-1, the second clock signal Clk-2 and the third clock signal Clk-3 are illustrated in the inset box 440 depicted in FIG. 6A.

The generator circuits of the synchronous generator apparatus 400 are interconnected such that the output of the first flip-flop 402 of the first generator circuit is connected to a second input of the exclusive-OR gate 412 of the third generator circuit. The output of the first flip-flop 404 of the second generator circuit is connected to a second input of the exclusive-OR gate 408 of the first generator circuit and the output of the first flip-flop 406 of the third generator circuit is connected to a second input of the exclusive-OR gate 410 of the second generator circuit.

The synchronous generator apparatus 400 further comprises a period counter 432 that counts the number of periods of the clock signal Clk-1 and generates an N-bit output word containing the count. The count is the timestamp TS that is assigned to the transitions in the input signal. The apparatus 400 further comprises an OR gate 434 having a first input connected to the output of the first generator circuit, a second input connected the output of the second generator circuit, and a third input connected the output of the third generator circuit. An output signal called 'TE' for transition event is generated by an output of the OR gate 434.

The synchronous generator apparatus 400 further comprises a clocked register or latch 436 having a chip enable input CE and a clock input. The chip enable input is connected to an output of the OR gate 434 and the first clock signal Clk-1 is applied to the clock input. The clock register 436 has at least N+M data inputs and N+M data outputs. As before, M=3 in the preferred embodiment. The first data input of the register 436 is connected to the output of the fourth flip-flop 426 of the first generator circuit. The second data input of the register 436 is connected to the output of the fourth flip-flop 428 of the second generator circuit, while the third data input of the register 436 is connected to the output of the fourth flip-flop 430 of the third generator circuit. The remaining N inputs are connected to N output lines from the period counter that carry the count.

A logic '1' in the transition event output signal TE indicates the detection of a transition by the apparatus 400. The logic '1' enables the register 436. During a next clock cycle after being enabled, the register 436 latches the data present on its N+M inputs and then transfers the latched data into its N+M data outputs. The N data outputs of the register 436, corresponding to the count information associated with the first clock signal Clk-1, are updated once for each transition that is detected.

An output signal on the first data output is called 'T12' and indicates that a transition was detected between a rising edge of the first clock signal Clk-1 and a next rising edge of the second clock signal Clk-2. An output signal on the second data output is called 'T23' and indicates that a transition was detected between a rising edge of the second clock signal Clk-2 and a next rising edge of the third clock signal Clk-3. An output signal on the third data output is called 'T31' and indicates that a transition was detected between a rising edge of the third clock signal Clk-3 and a next rising edge of the first clock signal Clk-1. Thus, by using the signals TE and the count data, a timestamp can be assigned to each transition in the input signal $S_{in}$, thereby generating a coarse transition timestamp. In addition, the timing of the transition detected within the period of the first clock signal Clk-1 can be determined using the signals T12, T23, and T31. The signals T12, T23, and T31 represent the SPT bits generated by synchronous coarse transition timestamp generator apparatus 400. Moreover, the apparatus 400 is referred to herein as 'synchronous' since the count and the signals T12, T23, and T31 are updated synchronously with respect to the first clock signal Clk-1.

Figure 6B:
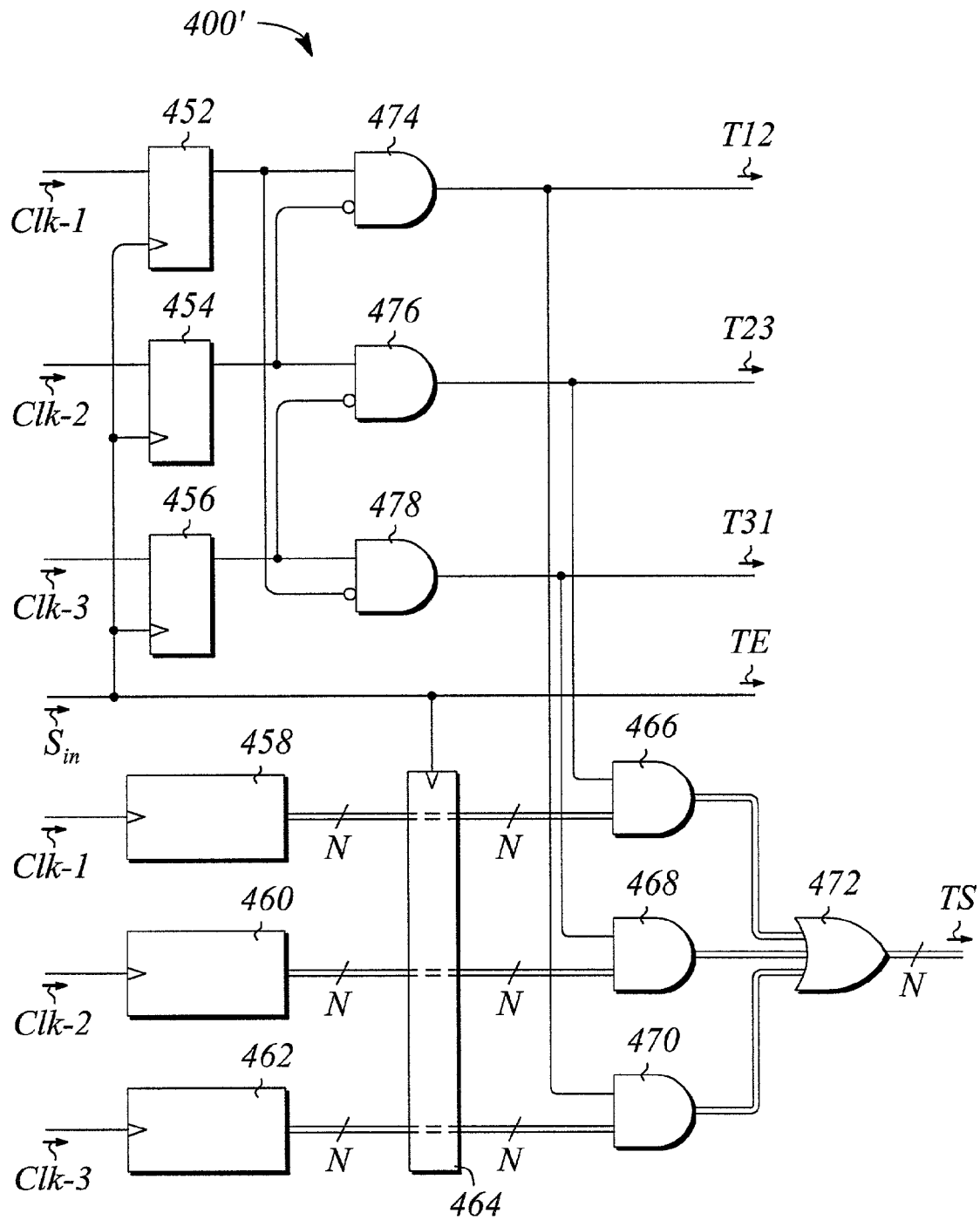
FIG. 6B illustrates a schematic block diagram of an apparatus for asynchronous coarse timestamp generation according to the present invention.

Another embodiment of a coarse timestamp generator apparatus 400' operates asynchronously relative to the first Clk-1, second Clk-2 and third Clk-3 clock signals. A block diagram of the apparatus 400' referred to herein as an 'asynchronous coarse timestamp generator' is illustrated in FIG. 6B. The block diagram of FIG. 6B is one example of how the 'asynchronous generator' apparatus 400' may be implemented. Further, the asynchronous generator apparatus 400' is yet another way of implementing the coarse TIA 202 of the apparatuses 200, 200', 300, 300' according to the invention. The apparatus 400' for asynchronous coarse timestamp generation comprises a plurality of M generator circuits that is clocked by transitions in an input signal, where M is greater than two. Each generator circuit receives a respective one of a plurality of M clock signals at a clock input and receives the input signal at a signal input. The coarse timestamp generator apparatus 400' illustrated in FIG. 6B has a first, second and third generator circuits for a preferred plurality of M=3 generator circuits and respective clock signals. The generator circuits of the apparatus 400' comprise the same components and operate in parallel, and are described below.

The generator circuits for the apparatus 400' for asynchronous coarse timestamp generation each comprise a clocked flip-flop 452, 454, 456, a two-input AND gate 474, 476, 478, and a period counter 458, 460, 462. The clock input of the generator circuit is connected to a data input of the flip-flop 452, 454, 456, and to a clock input of the period counter 458, 460, 462. The signal input of the generator circuit is connected to a clock input of the flip-flop 452, 454, 456. An output of the flip-flop 452, 454, 456 is connected to a first input of the two-input AND gate 474, 476, 478. The period counter 458, 460, 462 counts the number of periods of a clock signal applied to the clock input of the period counter 458, 460, 462 and generates an N-bit output word at a period counter output containing the count. The count is the timestamp TS that is ultimately assigned to the transitions in an input signal $S_{in}$.

The output of the flip-flop 452 of the first generator circuit is invertedly connected to a second input of the AND gate 478 of the third generator circuit. The output of the flip-flop 454 of the second generator circuit is invertedly connected to a second input of the AND gate 474 of the first generator circuit. The output of the flip-flop 456 of the third generator circuit is invertedly connected to a second input of the AND gate 476 of the second generator circuit. As should be readily apparent to one skilled in the art, the inverted connections referred to hereinabove may be achieved by a number of approaches including but not limited to inserting an inverter into the connection between the flip-flops 452, 454, 456 and the AND gates 474, 476, and 478, as illustrated in FIG. 6B, or for example, by utilizing flip-flops 452', 454', 456' (not illustrated) that each has a second output that is the inverse of a first output for the above-described inverted connections.

The input signal $S_{in}$ is applied to the signal input of each of the generator circuits. The three clock signals, Clk-1, Clk-2, Clk-3, described hereinabove are used with the asynchronous timestamp generator apparatus 400'. The first clock signal Clk-1 is applied to the clock input of the first generator circuit. The second clock signal Clk-2 is applied to the clock input of the second generator circuit and the third clock signal Clk-3 is applied to the clock input of the third generator circuit. Thus, period counter 458 of the first generator circuit counts the number of periods in the first clock signal Clk-1, the period counter 460 of the second generator circuit counts the number of periods in the second clock signal Clk-2, and the period counter 462 of the third generator circuit counts the number of periods in the third clock signal Clk-3. The current period counts for the period counters 458, 460, 462 of each of the generator circuits are output on a set of N signal lines at an output of each of the generator circuits, one set being associated with each of the counters 458, 460, and 462, respectively.

The asynchronous generator apparatus 400' further comprises a clocked register or parallel latch 464 having 3N data inputs and 3N data outputs divided into a first set of N input/outputs, a second set of N input/outputs, and a third set of N input/outputs. The input signal $S_{in}$ is applied to a clock input and is used to clock the register 464. During a clock cycle, the register 464 latches data present on its 3N inputs and then transfers the latched data to its 3N data outputs where the data is held until the next clock cycle. The N output lines of the period counter 458 of the first generator circuit are connected to the first set of N inputs of the register 464. The N output lines of the period counter 460 of the second generator circuit are connected to the second set of N inputs of the register 464. The N output lines of the period counter 462 of the third generator circuit are connected to the third set of N inputs of the register 464.

The asynchronous generator apparatus 400' further comprises a first N-bit parallel AND gate 466, a second N-bit parallel AND gate 468 and a third N-bit parallel AND gate 470, and a 3-input N-bit parallel OR gate 472. The N-bit parallel AND gates 466, 468, 470 each have N+1 inputs and N outputs. A first input of each of the N-bit parallel AND gates 466, 468, 470 is a 'Gate' input while the remaining N inputs are data inputs. The Gate inputs are each connected to a different one of an output of a generator circuit. A logic '1' on the Gate input enables data present at the data inputs to pass to the data outputs. A logic '0' on the Gate input blocks data passage and forces all N data outputs to a logic '0' state. The 3-input N-bit parallel OR gate 472 has 3 sets of N inputs and N outputs. The output logic state produced by the 3-input N-bit parallel OR gate 472 is the logical 'OR' of the three sets of N inputs. Thus, a first output of the N outputs will represent the logical 'OR' or a first input of each of the 3 sets of inputs. Likewise, a second output of the N outputs will represent the logical 'OR' of a second input of each of the 3 sets of inputs, and so on.

Figure 6C:
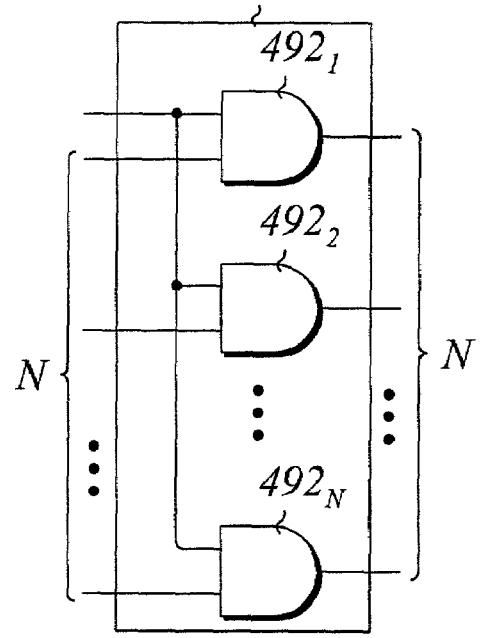
FIG. 6C illustrates a schematic block diagram of an N-bit wide gated select circuit used in the apparatus illustrated FIG. 6B.

FIG. 6C illustrates a schematic block diagram of one possible realization of the N-bit parallel AND gate 466, 468, 470. The N-bit parallel AND gate illustrated in FIG. 6C comprises a quantity N of 2-input AND gates 492. The Gate input of the N-bit parallel AND gate 466, 468, 470 is connected to a first input of each of the 2-input AND gates 492$_{1 \to N}$. A first input of the N data inputs of the AND gate 466, 468, 470 is connected to a second input of a first 2-input AND gate 492$_1$. A second input of the N data inputs of AND gate 466, 468, 470 is connected to a second input of a second 2-input AND gate 492$_2$, and so on, until an N-th data input is connected to a second input of an N-th 2-input AND gate 492$_N$. An output of the first 2-input AND gate 492$_1$ is connected to a first output of the N data outputs of the N-bit parallel AND gate 466, 468, 470. An output of the second 2-input AND gate 492$_2$ is connected to a second of the N data outputs, and so on, until an output of the N-th 2-input AND gate 492$_N$ is connected to an N-th data output of the N-bit parallel AND gate 466, 468, 470.

Figure 6D:
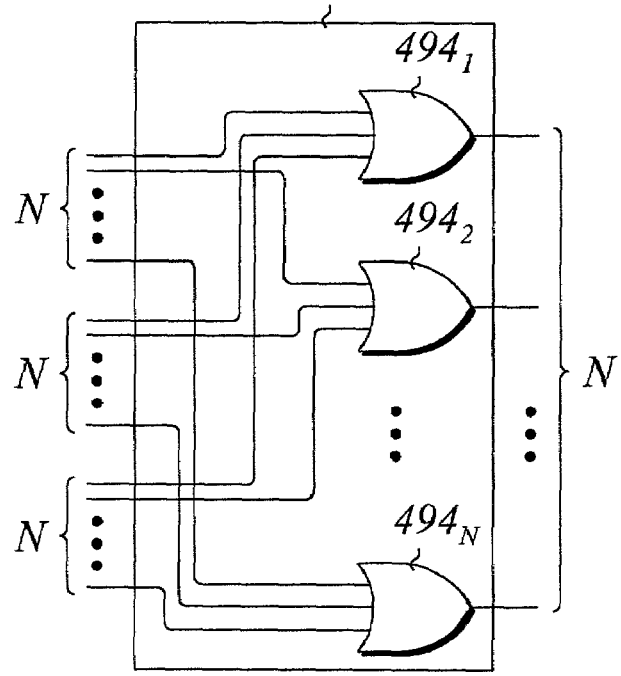
FIG. 6D illustrates a schematic block diagram of a 3 by N 'OR' structure used in the apparatus illustrated in FIG. 6B.

FIG. 6D illustrates a schematic block diagram of one possible realization of the 3-input N-bit parallel OR gate 472. The 3-input N-bit parallel OR gate 472 illustrated in FIG. 6D comprises a quantity N of 3-input OR gates 494. A first data input of the first, second and third sets of N data inputs from the N-bit parallel AND gates 466, 468, 470 is connected to a first, second and third input, respectively, of a first 3-input OR gate 494₁. A second data input of the first, second and third sets of the N data inputs is connected to a first, second and third input, respectively, of a second 3-input OR gate 494₂, and so on. An output of the first 3-input OR gate 494₁ is connected to a first data output of the N data outputs of the 3-input N-bit parallel OR gate 472. Similarly, an output of the second 3-input OR gate 494₂ is connected to a second data output of the N data outputs, and so on.

Referring again to FIG. 6B, the first set of N outputs of the register 464 are connected to the N data inputs of the first N-bit parallel AND gate 466. The second set of N outputs of the register 464 are connected to the N data inputs of the second N-bit parallel AND gate 468, and the third set of N outputs of the register 464 are connected to the N data inputs of the third N-bit parallel AND gate 470. The N outputs of the first N-bit parallel AND gate 466 are connected to the first set of N inputs of the 3-input N-bit parallel OR gate 472. The N outputs of the second N-bit parallel AND gate 468 are connected to the second set of N inputs of the 3-input N-bit parallel OR gate 472, and the N outputs of the third N-bit parallel AND gate 470 are connected to the third set of N inputs of the 3-input N-bit parallel OR gate 472.

The Gate input of the first N-bit parallel AND gate 466 is connected to an output of the AND gate 476 of the second generator circuit. The Gate input of the second N-bit parallel AND gate 468 is connected to an output of the AND gate 478 of the third generator circuit and the Gate input of the third N-bit parallel AND gate 470 is connected to an output of the AND gate 474 of the first generator circuit.

The N outputs of the 3-input parallel OR gate 472 carry a signal TS representing the timestamp generated by the asynchronous transition timestamp generator apparatus 400' of the present invention. A transition event can be recognized by a transition on signal TE that is simply the input signal $S_{in}$. A signal T12 produced by the output of the AND gate 474 of the first generator circuit indicates detection of a transition occurring between a rising edge of the first clock signal Clk-1 and a next rising edge of the second clock signal Clk-2. A signal T23 produced by the output of the AND gate 476 of the second generator circuit indicates detection of a transition occurring between a rising edge of the second clock signal Clk-2 and a next rising edge of the third clock signal Clk-3. A signal T31 produced by the output of the AND gate 478 of the third generator circuit indicates detection of a transition occurring between a rising edge of the third clock signal Clk-3 and a next rising edge of the first clock signal Clk-1. Thus, the operation of the asynchronous transition timestamp generator apparatus 400' is analogous to that of the synchronous transition timestamp apparatus 400 except that the output data carried in the signals TS, T12, T23, T31, and TE are not synchronized to the first, second, or third clocks. In most applications, the synchronous transition timestamp generator apparatus 400 is preferred. As is for apparatus 400, the signals T12, T23, and T31 produced by the asynchronous generator apparatus 400' illustrated in FIG. 6B, represent the SPT bits as is generated by the synchronous generator apparatus 400.

Thus, there has been described novel methods 100, 124', 124'', 124''' 124'''', and apparatuses 200, 200', 300, 300', 400, and 400' for utilizing transition timestamps for testing digital devices having application to ATE, logic analyzers, bit error rate testers, protocol analyzers and other apparatuses that deal with digital signals. It should be understood that the above-described embodiments are merely illustrative of the some of the many specific embodiments that represent the principles of the present invention. Clearly, those skilled in the art can readily devise numerous other arrangements without departing from the scope of the present invention.

What is claimed is:

1. A method of testing a device using transition timestamps comprising carrying out a bit-level test on the device, the bit-level test comprising the steps of:
   measuring a coarse timestamp for a transition in a signal under test from the device;
   comparing the measured coarse timestamp to an expected timestamp to determine whether the device meets specifications; and
   repeating the steps of measuring and comparing iteratively for a sequence of transitions in a signal duration.

2. The method of claim 1, wherein after the step of comparing, further comprising the steps of:
   subtracting the measured timestamp from the expected timestamp to generate a skew value; and
   comparing the skew value to a specified maximum skew, such that a Skew Fault is indicated when the skew value is greater than the specified maximum skew.

3. The method of claim 1, wherein after the step of comparing further comprising the steps of:
   subtracting the measured timestamp from the expected timestamp to generate a skew value;
   generating a drift difference by subtracting a previous skew value from the skew value;
   comparing the drift difference to a maximum allowed difference;
   computing an expected transition difference from a difference between the expected timestamp and a previous expected timestamp;
   comparing the expected transition difference to a minimum interval; and
   determining whether a Bit Fault is indicated from the steps of comparing the drift difference and comparing the expected transition difference, wherein the Bit Fault is indicated if the drift difference is greater than the maximum allowed difference and the expected transition difference is less than the minimum interval.

4. The method of claim 1, wherein after the step of comparing further comprising the steps of:
   subtracting the measured timestamp from the expected timestamp to generate a skew value;
   generating a drift difference by subtracting a previous skew value from the skew value;
   comparing the drift difference to a maximum allowed difference;
   computing an expected transition difference from a difference between the expected timestamp and a previous expected timestamp;
   comparing the expected transition difference to a minimum interval; and
   determining whether a No Coverage Warning is indicated from the steps of comparing the drift difference and comparing the expected transition difference, wherein the No Coverage Warning is indicated if the drift difference is greater than the maximum allowed difference and the expected transition difference is greater than the minimum interval.

5. The method of claim 1, wherein after the step of comparing further comprising the steps of:
   subtracting the measured timestamp from the expected timestamp to generate a skew value;
   computing a k-th drift difference, wherein the k-th drift difference is a difference between an i-th skew value and a k-th previous skew value;

computing a tolerable time interval, wherein the tolerable time interval is a function g(•) of the k-th drift difference given by equations (3) and (4);

computing a k-th expected transition difference, wherein the k-th expected transition difference is a difference between the i-th expected timestamp and the k-th previous expected timestamp; and comparing the k-th expected transition difference to the tolerable time interval, such that a Drift Fault is indicated when the tolerable time interval is greater than the k-th expected transition difference.

6. The method of claim 1, wherein the step of measuring comprises the step of measuring all coarse timestamps in the sequence of transitions in the signal under test during the signal duration before the step of comparing; and wherein the step of comparing comprises the step of comparing the measured timestamp sequence to an expected timestamp sequence; and wherein in the step of repeating, the steps of measuring all timestamps and comparing sequences are iteratively repeated for each sequence.

7. The method of testing of claim 1, further comprising independently performing a timing test on the device that comprises the steps of:

generating a transition timestamp sequence for the signal under test, the transition timestamp sequence comprising timestamps on a set of transitions in the signal under test during a timing test signal duration; and checking the transition timestamps of the sequence.

8. The method of testing of claim 7, wherein in the step of generating, the set of transitions is less than all transitions in the timing test signal duration.

9. The method of testing of claim 7, wherein the step of checking comprises the steps of:

comparing transition timestamps in the generated transition timestamp sequence to one another to determine whether timing of the transitions meets device specifications.

10. The method of testing of claim 7, wherein the step of checking comprises the steps of:

comparing the generated transition timestamp sequence to an expected timestamp sequence for the device.

11. A method of determining whether a fault is indicated in a bit-level test on a device under test using transition timestamps, the method comprising the steps of:

measuring a coarse timestamp for a transition in an output signal from the device under test during a signal duration; and subtracting the measured timestamp from an expected timestamp to generate a skew value.

12. A method of determining of claim 11, further comprising the step of:

comparing the skew value to a specified maximum skew, such that a Skew Fault is indicated when the skew value is greater than the specified maximum skew.

13. The method of determining of claim 11, further comprising the steps of:

generating a drift difference by subtracting a previous skew from the skew value;

comparing the drift difference to a maximum allowed difference;

computing an expected transition difference from a difference between the expected timestamp and a previous expected timestamp; and comparing the expected transition difference to a minimum interval.

14. The method of determining of claim 13, wherein in the steps of comparing the drift difference and comparing the expected transition difference, a Bit Fault is indicated if the drift difference is greater than the maximum allowed difference and the expected transition difference is less than the minimum interval.

15. The method of determining of claim 13, wherein in the steps of comparing the drift difference and comparing the expected transition difference, a No Coverage Warning is indicated if the drift difference is greater than the maximum allowed difference and the expected transition difference is greater than the minimum interval.

16. The method of determining of claim 11, further comprising the steps of:

computing a k-th drift difference, wherein the k-th drift difference is a difference between an i-th skew value and a k-th previous skew value;

computing a tolerable time interval, wherein the tolerable time interval is a function g(•) of the k-th drift difference given by equations (3) and (4);

computing a k-th expected transition difference, wherein the k-th expected transition difference is a difference between the i-th expected timestamp and the k-th previous expected timestamp; and comparing the k-th expected transition difference to the tolerable time interval, such that a Drift Fault is indicated when the tolerable time interval is greater than the k-th expected transition difference.

17. An apparatus for carrying out bit-level testing on a device using transition timestamps comprising:

a first coarse timing interval analyzer (TIA) having a first TIA input that receives a signal under test from the device and a first TIA output;

a first FIFO memory having a first FIFO input that receives a measured timestamp from the first TIA output;

a second FIFO memory having a second FIFO input that produces an expected timestamp;

a first subtractor having a first subtractor subtrahend input that receives the measured timestamp from the first FIFO, a first subtractor minuend input that receives the expected timestamp from the second FIFO and a first subtractor output; and a Skew Fault detection circuit comprising a first comparator having a first input that receives skew value representing the difference between the measured timestamp and the expected timestamp from the first subtractor, a second input that receives a specified maximum skew, and a first comparator output.

18. The apparatus for carrying out bit-level testing of claim 17, further comprising:

a Bit Fault detection circuit connected to the first subtractor output;

a No Coverage Warning detection circuit connected to the second FIFO output;

a first AND gate having a first gate input and a first gate inverted input, wherein an output of the No Coverage Warning circuit is connected to the inverted input, and an output of the Bit Fault circuit is connected to the first gate input; and a second AND gate having two second gate inputs, wherein the Bit Fault circuit output is further connected to one of the two second gate inputs, and the No Coverage Warning output is further connected to another of the two second gate inputs.

19. The apparatus for carrying out bit-level testing of claim 18, wherein the Bit Fault detection circuit comprises:

a second subtractor having a second subtractor subtrahend input that receives the skew value from the first subtractor, a second subtractor minuend input, and a second subtractor output;

a bit fault latch that receives the skew value from the first subtractor and produces a previous skew value that is received by the second subtractor minuend input; and a second comparator having a first input that receives a drift difference from the second subtractor, a second input that receives a maximum allowed difference, and a second comparator output.

20. The apparatus for carrying out bit-level testing of claim 19, wherein the No Coverage Warning detection circuit comprises:

a third subtractor having a third subtractor subtrahend input that receives the expected timestamp from the second FIFO, a third subtractor minuend input, and a third subtractor output, a no coverage fault latch that receives the expected timestamp from the second FIFO and produces a previous expected timestamp that is received by the third subtractor minuend input;

a third comparator having a first input that receives an expected transition difference from the third subtractor, a second input that receives a minimum interval, and a third comparator output.

21. The apparatus of claim 20, wherein the maximum allowed difference has a constant value for all bit intervals in the signal under test.

22. The apparatus of claim 20, wherein the maximum allowed difference has a different value for at least one bit interval in the signal under test.

23. The apparatus for carrying out bit-level testing of claim 17, further comprising Drift Fault detection circuitry that comprises:

a drift difference circuit that receives the skew value from the first subtractor output;

a transition difference measurement circuit that receives the expected timestamp from the second FIFO output; and a drift fault comparator having two inputs, a first input connected to an output of the drift difference circuit and a second input connected to an output of the transition difference circuit.

24. The apparatus for carrying out bit-level testing of claim 23, wherein the drift difference circuit measures tolerable drift and comprises:

a first set of quantity k sequentially connected latches, a first latch of the first set having an input that receives the skew value from the first subtractor output, and an output connected to a second latch of the first set, the second latch through a (k-1)-th latch each having an input connected to a previous latch and an output connected to a next latch, a k-th latch of the first set having an output;

a first multiplexer, the outputs of the first set of latches each being further connected to separate inputs of the first multiplexer;

a second subtractor having a second subtractor subtrahend input that receives the skew value from the first subtractor, a second subtractor minuend input that receives a k-th previous skew value from the first multiplexer, and a second subtractor output; and a first memory that receives a k-th drift difference from the second subtractor output and produces the first output signal, which is a tolerable time interval based on a function g(•) that is received by the first input of the drift fault comparator.

25. The apparatus for carrying out bit-level testing of claim 24, wherein the transition difference circuit measures a transition difference and comprises:

a second set of quantity k sequentially connected latches, a first latch of the second set having an input that receives the expected timestamp from the second FIFO and an output connected to a second latch of the second set, the second latch through a (k-1)-th latch each having an input connected to a previous latch and an output connected to a next latch, a k-th latch of the second set having an output;

a second multiplexer, the outputs of the second set of latches each being further connected to a separate input of the second multiplexer, a third subtractor having a third subtractor subtrahend input that receives the expected timestamp from the second FIFO, a third subtractor minuend input that receives a k-th previous expected timestamp from the second multiplexer, and a third subtractor output that produces the second output signal, which is a k-th expected transition difference that is received by the second input of the drift fault comparator.

26. An apparatus for synchronously generating a transition timestamp comprising:

a plurality of M generator circuits that is clocked by a plurality of M clock signals, where M is greater than two, each generator circuit having a signal input, a clock input and a generator output;

a period counter having a counter clock input and a plurality of N outputs, the counter being clocked by a first clock signal at the counter clock input and producing an N-bit word comprising a count of periods of the first clock signal on the plurality of N outputs;

an OR gate having a plurality of M inputs and an output, a first gate input being connected to an output of a first generator, a second gate input being connected to an output of a second generator, and a third gate input being connected to an output of a third generator; and a register having a chip enable input, a register clock input, a plurality of N+M data inputs, and a plurality of N+M data outputs, the register being clocked by the first clock signal at the register clock input, wherein the chip enable input is connected to the OR gate output, N of the plurality of N+M data inputs is connected to receive the N-bit word from the plurality of N outputs of the period counter, and wherein the outputs of the plurality of M generators are each further connected to a respective one of the M data inputs of the plurality N+M data inputs, wherein each clock signal of the plurality of M clock signals are time delayed relative to each other by 1/M of a clock period and have a same clock frequency and a same clock period, and wherein the count and the plurality of generator data outputs of the register are updated synchronously with respect to the first clock signal.

27. The apparatus for synchronously generating transition timestamps of claim 26, wherein M=3 and the relative time delay of the clock signals is one third of the clock period, and wherein the first generator circuit receives a first clock signal, the second generator circuit receives a second clock signal, and the third generator circuit receives a third clock signal of the plurality M clock signals, respectively.

28. The apparatus for synchronously generating transition timestamps of claim 27, wherein each respective generator circuit comprises:
- a plurality of flip-flops, each flip-flop having a clock input and a data input and an output, the data input of a first flip-flop of the plurality being connected to the signal input of the respective generator circuit, such that the data input of the first flip-flop receives an input signal, and the clock inputs of the first flip-flop a second flip-flop of the plurality receives the respective clock signal from the clock input of the respective generator circuit, and wherein the clock input of a third flip-flop of the first generator and the second generator receives the first clock signal, the clock input of the third flip-flop of the third generator receives the second clock signal, and wherein the clock input of a last flip-flop of each generator receives the first clock signal; and
- an exclusive OR gate having two inputs and an output, wherein the output of the first flip-flop is connected to one input of the exclusive OR gate, and the output of the exclusive OR gate is connected to the data input of the second flip-flop,
- wherein the output of the second flip-flop is connected to the data input of the third flip-flop and the output of the third flip-flop is connected to the data input of the last flip-flop, and the output of the last flip-flop is connected to the generator output, and
- wherein the output of the first flip-flop of the first generator is further connected to another input of the OR gate of the third generator, the output of the first flip-flop of the second generator is further connected to another input of the exclusive OR gate of the first generator, and the output of the first flip-flop of the third generator is further connected to another input of the exclusive OR gate of the second generator.

29. An apparatus for asynchronously generating transition timestamps comprising:
- a plurality of M generator circuits that is clocked by an input signal and receives a plurality of M clock signals, where M is greater than two, wherein each of the plurality of generators receives the input signal at a generator signal input and a respective clock signal at a clock input of the generator;
- a register having three sets of N data inputs, three sets of N data outputs, and a register clock input connected to the generator signal input, the register being clocked by the input signal,
- a plurality M of N-bit parallel AND gates, each having N data inputs, a gate input connected to a different output of the plurality of M generator circuits, and N data outputs, the N data inputs of a first parallel AND gate being connected to the N data outputs of a first set of the register N data outputs, the N data inputs of a second parallel AND gate being connected to the N data outputs of a second set of the register N data outputs, and the N data inputs of a third parallel AND gate being connected to the N data outputs of a third set of the register N data outputs, and wherein the gate input of the first parallel AND gate is connected to the output of a second generator circuit, and the gate input of the second parallel AND gate is connected to the output of a third generator circuit, and the gate input of the third parallel AND gate is connected to the output of a first generator circuit; and
- an N-bit parallel OR gate having three sets of N inputs, and N outputs, a first set of OR gate N inputs being connected to the N outputs of the first parallel AND gate, a second set of OR gate N inputs being connected to the N outputs of the second parallel AND gate, and a third set of OR gate N inputs being connected to the N outputs of the third parallel AND gate, and the OR gate N outputs being connected to the counter circuit N outputs, and
- wherein the plurality of clock signals is time delayed relative to each other by 1/M of a clock period and have a same clock frequency and a same clock period.

30. The apparatus for asynchronously generating transition timestamps of claim 29, wherein each generator circuit of the plurality of generator circuits comprises:
- a flip-flop having a data input connected to the generator clock input, a clock input connected to the generator signal input, and an output;
- an AND gate having two inputs and an output, the output of the flip-flop being connected to one of the AND gate inputs, and the output of the AND gate being connected to a generator output; and
- a period counter having a clock input connected to the generator clock input, and N outputs, the counter being clocked by a respective one of the M clock signals and producing an N-bit word comprising a count of periods of the clock signal on the plurality of N outputs,
- wherein the output of the input flip-flop of a first generator is further invertedly connected to another of the inputs of a third AND gate, the output of the input flip-flop of a second generator is further invertedly connected to another of the inputs of a first AND gate, and the output of the input flip-flop of a third generator is further invertedly connected to another of the inputs of a second AND gate.

31. The apparatus for asynchronously generating transition timestamps of claim 29, wherein M=3 and the relative time delay of the clock signals is one third of the clock period, and wherein a first generator circuit receives a first clock signal, a second generator circuit receives a second clock signal, and a third generator circuit receives a third clock signal of the plurality M clock signals, respectively.

32. A method of carrying out a bit-level Skew Fault error test on a device under test using transition timestamp sequences comprising the steps of:
- measuring a coarse timestamp for a transition in an output signal from the device under test during a signal duration;
- subtracting the measured timestamp from an expected timestamp to generate a skew value; and
- comparing the skew value to a specified maximum skew, such that a Skew Fault is indicated when the skew value is greater than the specified maximum skew.

33. A method of carrying out a bit-level Bit Fault error test on a device under test using transition timestamp sequences comprising the steps of:
- measuring a coarse timestamp for a transition in an output signal from the device under test during a signal duration;
- subtracting the measured timestamp from an expected timestamp to generate a skew value;
- generating a drift difference by subtracting a previous skew value from the skew value;
- comparing the drift difference to a maximum allowed difference;
- computing an expected transition difference from a difference between the expected timestamp and a previous expected timestamp; and comparing the expected transition difference to a minimum interval, wherein the Bit Fault error is indicated if the drift difference is greater than the value and the expected transition difference is less than the minimum interval.

34. A method of carrying out a bit-level No Coverage Warning error test on a device under test using transition timestamp sequences comprising the steps of:

measuring a coarse timestamp for a transition in an output signal from the device under test during a signal duration;

subtracting the measured timestamp from an expected timestamp to generate a skew value;

generating a drift difference by subtracting a previous skew value from the skew value;

comparing the drift difference to a maximum allowed difference;

computing an expected transition difference from a difference between f the expected timestamp and a previous expected timestamp; and comparing the expected transition difference to a minimum interval, wherein the No Coverage Warning error is indicated if the drift difference is greater than the value and the expected transition difference is greater than the minimum interval.

35. A method of carrying out a bit-level Drift Fault error test on a device under test using transition timestamp sequences comprising the steps of:

measuring a coarse timestamp for a transition in an output signal from the device under test during a signal duration;

subtracting the measured timestamp from an expected timestamp to generate a skew value;

computing a k-th drift difference, wherein the k-th drift difference is a difference between an i-th skew value and a k-th previous skew value;

computing a tolerable time interval, wherein the tolerable time interval is a function $g(\bullet)$ of the k-th drift difference given by equations (3) and (4);

computing a k-th expected transition difference, wherein the k-th expected transition difference is a difference between the i-th expected timestamp and the k-th previous expected timestamp; and comparing the k-th expected transition difference to the tolerable time interval, such that a Drift Fault error is indicated when the tolerable time interval is greater than the k-th expected transition difference.

36. A testing system for testing a device under test comprising:

a timing test subsystem that performs timing tests using a subset of transition timestamps from a signal under test; and a bit-level test subsystem that performs bit-level tests using coarse timestamps from a signal under test.

\* \* \* \* \*

UNITED STATES PATENT AND TRADEMARK OFFICE
CERTIFICATE OF CORRECTION

PATENT NO. : 6,993,695 B2
APPLICATION NO. : 09/875,567
DATED : January 31, 2006
INVENTOR(S) : Rivoir Page 1 of 1

It is certified that error appears in the above-identified patent and that said Letters Patent is hereby corrected as shown below:

In column 30, lines 63-65, in Claim 27, after "one third" delete "of the clock period, and wherein the first generator circuit receives a first clock signal,".

In column 33, line 19, in Claim 34, after "between" delete "f".

Signed and Sealed this

Twenty-fifth Day of December, 2007

JON W. DUDAS
*Director of the United States Patent and Trademark Office*